United States Patent [19]
White et al.

[11] Patent Number: 5,757,582
[45] Date of Patent: May 26, 1998

[54] MINIATURE HARD DISK DRIVE SYSTEM

[75] Inventors: Norman Jackson White, Kinross; Michael Gordon Caithness, Dunfermline; Roderick Munro Urquhart, Glenrothes; Alec Donald Stewart, Scotlandwell, all of United Kingdom

[73] Assignee: Calluna Technology Limited, Edinburgh, Scotland

[21] Appl. No.: 436,400

[22] PCT Filed: Nov. 17, 1993

[86] PCT No.: PCT/GB93/02366

§ 371 Date: Aug. 3, 1995

§ 102(e) Date: Aug. 3, 1995

[87] PCT Pub. No.: WO94/11877

PCT Pub. Date: May 26, 1994

[30] Foreign Application Priority Data

Nov. 18, 1992 [GB] United Kingdom ............... 9224176

[51] Int. Cl.$^6$ .................................. G11B 5/012
[52] U.S. Cl. .................................. 360/98.01
[58] Field of Search .................... 360/98.01, 105

[56] References Cited

U.S. PATENT DOCUMENTS

| | | | |
|---|---|---|---|
| 5,243,495 | 9/1993 | Read et al. | 361/685 |
| 5,291,110 | 3/1994 | Andrews, Jr. et al. | 318/560 |
| 5,291,355 | 3/1994 | Hatch et al. | 360/97.01 |
| 5,339,209 | 8/1994 | Dion | 360/105 |
| 5,377,065 | 12/1994 | Morehouse et al. | 360/105 |
| 5,389,850 | 2/1995 | Wilmer | 310/329 |
| 5,392,172 | 2/1995 | Beecroft | 360/97.01 |
| 5,442,266 | 8/1995 | Morehouse et al. | 318/272 |
| 5,502,604 | 3/1996 | Furay | 360/97.01 |

FOREIGN PATENT DOCUMENTS

| | | |
|---|---|---|
| 0 238 410 | 9/1987 | European Pat. Off. |
| 0 298 748 | 1/1989 | European Pat. Off. |
| 3-345610 | 7/1993 | Japan |
| 92/11628 | 7/1992 | WIPO |
| 92/07909 | 9/1992 | WIPO |
| 92/07912 | 9/1992 | WIPO |
| 94/03106 | 3/1994 | WIPO |
| 94/09486 | 4/1994 | WIPO |
| 94/11873 | 5/1994 | WIPO |

OTHER PUBLICATIONS

"Four Founding Engineers, Marketer Exit Prairie Tek", Electronic News, Sep. 17, 1990, by Brian Deagon.

(List continued on next page.)

Primary Examiner—John H. Wolff
Attorney, Agent, or Firm—Bell Seltzer Intellectual Property Law Group of Alston & Bird, LLP

[57] ABSTRACT

The present invention relates to a miniature hard disk drive system including a substantially sealed enclosure housing a head-disk assembly and a printed circuit board assembly. The head-disk assembly includes a rotary drive motor and an actuator assembly which pivotally supports and positions one or more read-write head flexure assemblies. In one aspect of the invention, the drive system includes two miniature hard disks having an outer diameter of between 40 mm and 50 mm and has a total thickness not exceeding 10.5 mm. In another aspect, the printed circuit board assembly has first contact pads and the head-disk assembly has a flexible circuit assembly with a first flexible portion connected to the actuator assembly for electrical connection to the read-write heads and with a second flexible portion having second contact pads. A miniature elastomeric connector is mounted in an aperture in a planar side wall of the enclosure for providing a low current capacity electrical connection between the first and second contact pads for facilitating data transmission between the read-write heads and the printed circuit board assembly. In addition, the miniature elastomeric connector provides a high current capacity electrical connection between the printed circuit board assembly and the rotary drive motor of the head-disk assembly.

16 Claims, 11 Drawing Sheets

OTHER PUBLICATIONS

1990, "Integral: Subminiature hard drives in the works", by Brian Gillooly.

Computergram International, London, Nov. 20, 1990, No. 1,558, "Integral reveals plans to make 1.8" Disk Drives.

Computer Data Storage Newsletter, vol. 3 No. 12, Issue No. 35, p. 10, Dec. 1990, "Integral in 2.5 inch and smaller drives".

EDN, Sep. 2, 1991, News Breaks, "Low-Power, 1.8 in. Hard-Disk Holds 21.4MBytes".

Ministor Fact Sheet, Aug. 29, 1991.

Integral Peripherals Press Release, Sep. 1991: Questions & Answers, pp. 1–6; Technical Overview, pp. 1–7.

Electronics Times, Sep. 12, 1991, "Mustang Drive".

Electronic World News, Oct. 7, 1991, pp. 2 and 13, "Minister ready to make 1.8–in. drives and Minister lays plans to make 1.8–inch drives in Singapore".

Electronic Design, Sep. 12, 1991, Technology Newsletter, p. 28, "1.8–In. Hard Drive Hits The Street".

EDN, Sep. 16, 1991, p. 99, "Low–power, 1.8–in. hard–disk drive holds 21.4MBytes, withstands 200g shocks".

Electronics Times, Sep. 19, 1991, p. 55, "World first claim on a platter".

Micro Technology, Oct. 1991, Data Storage Feature "Drives fight to keep data in the spin plus Data Storage—The Ever–shrinking hard drive".

Eurotrade, Feb. 1991, p. 37, "Disk Drives—Running Against the Giants".

Integral Peripherals Press Release, Mar. 3, 1992.

Ministor Preliminary Specifications Sheet—Miniport 64 ®, Mar./Apr. 1992.

Ministor Press Release, Mar. 23, 1992.

Computergram International, Mar. 26, 1992, No. 1,889, "Ministor Launches its Fast 32 Mb 1.8 Drives".

"MiniStor to Debut 'Disk on a Card'", Mar. 1992.

Computer Data Storage Newsletter, vol. 5, No. 4, Apr. 1992, Issue No. 51, pp. 1–6, "After 2.5 Inches, 1.8–Inch Form Factor To Become The New DeFacto Standard".

Electronic World News, Apr. 6, 1992, "NEC antes 1.8 drive with 86 MBytes".

Electronic Engineering Times, Jul. 20, 1992, pp. 54–55, "How Design Team made Kittyhawk fly".

EDN, Apr. 9, 1992, News Breaks, "Choose interface and form factor for your drives".

Electronic Engineering Times, Apr. 1992, "Ministor Shifts drive focus".

Computergram International, London, Apr. 27, 1992, No. 1909, "NEC ups ante with Aura–designed 1.8 Disk Drive Storing 85 Mb".

Computergram International, London, May 8, 1992, No. 1917, "... And Fujisawa previews 40 Mb 60 Mb and 80 Mb 1.8 Disk Drives".

Integral Peripherals, Press Release, May 1992, "Stingray and Maverick" details.

Computergram International, London, Jun. 2, 1992, No. 1,933, "Seagate Crams 210 mb onto 2.5 Disk, has first 1.8".

Computergram International, London, Jun. 9, 1992, No. 1938, "Hewlett aims to set New Standard with 1.3 Disk".

Computergram International, Jun. 10, 1992, No. 1939, article concerning Hewlett–Packard Co.'s "Kittyhawk" Disk Drive.

Financial Times, Jun. 12, 1992, "Hard disk resists shock treatment".

EDN, Jun. 18, 1992, p. 77, "Disk Drive Stores 21 Mbytes using 1.3–in platters".

Electronic World News, Jun. 1992, pp. 4–5, "Seagate opens 1.8 inch–drive market".

Electronic Design, Jun. 25, 1992, "Subminiature Disk Drives become PC–Board–Mountable Components".

Computergram International, London, Oct. 5, 1992, No. 2,021, "Awa Signs Bulgaria to assemble 1.8 Head–Disk Assemblies".

Electronic Times, Aug. 10, 1992, European News, "Bulgarians wooed by Aura of the West to make discs".

Computergram International, London, Oct. 14, 1992, No. 2,028, "Integral Systems has 40 Mb, 85 Mb 1.8 PCMCIA Disks".

EDN, Aug. 20, 1992, p. 58, "Stingray 1842 1.8–in Disk Drive".

Western Digital Release, Oct. 1992, "Caviar Ultralite CU140".

Electronic Design, Jun. 11, 1992, "1.8–In. Disk Drives Pack up to 85.3 MBytes", p. 124.

Electronics, Sep. 1991, "The 1.8–In. Hard Drives Have Landed", p. 20.

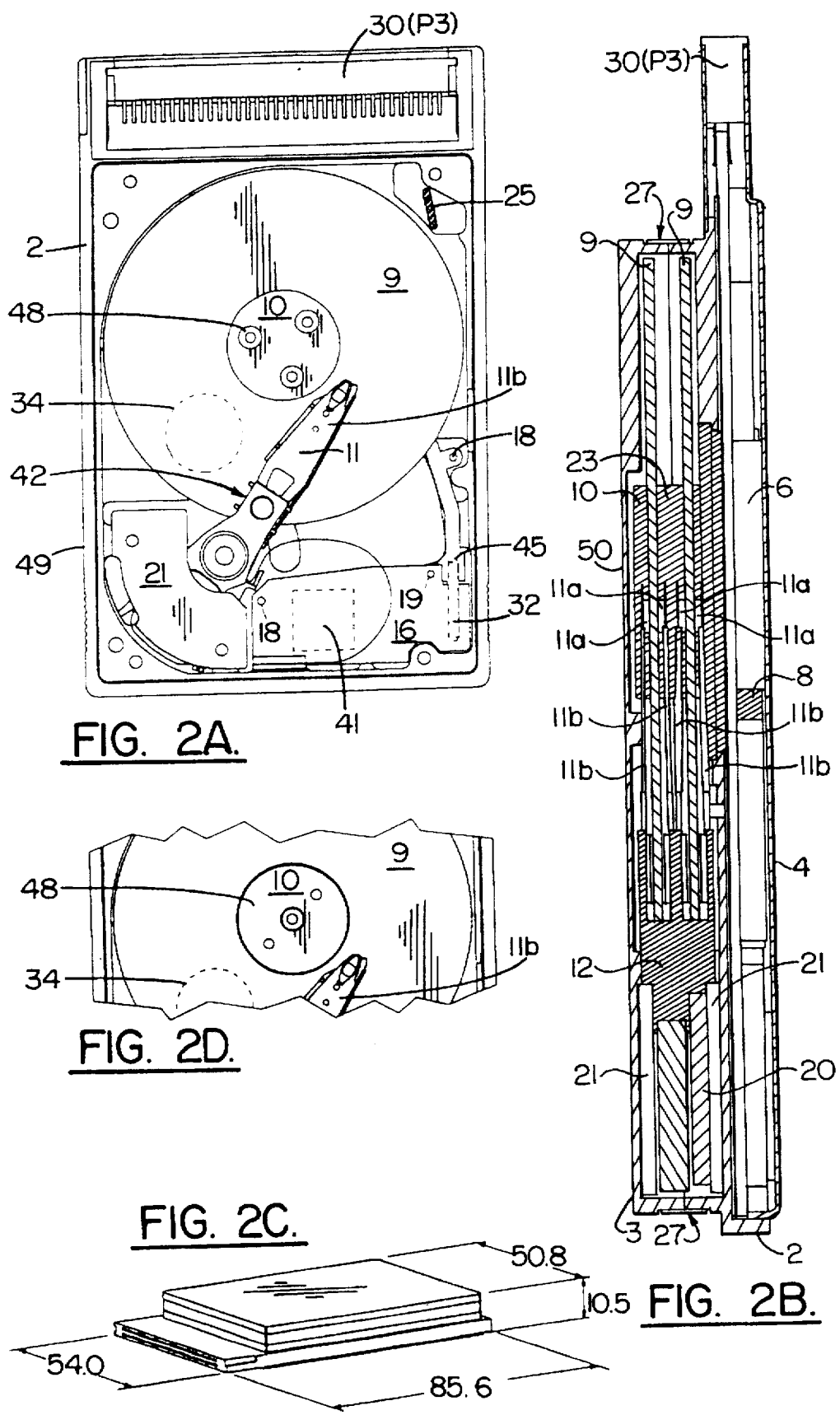

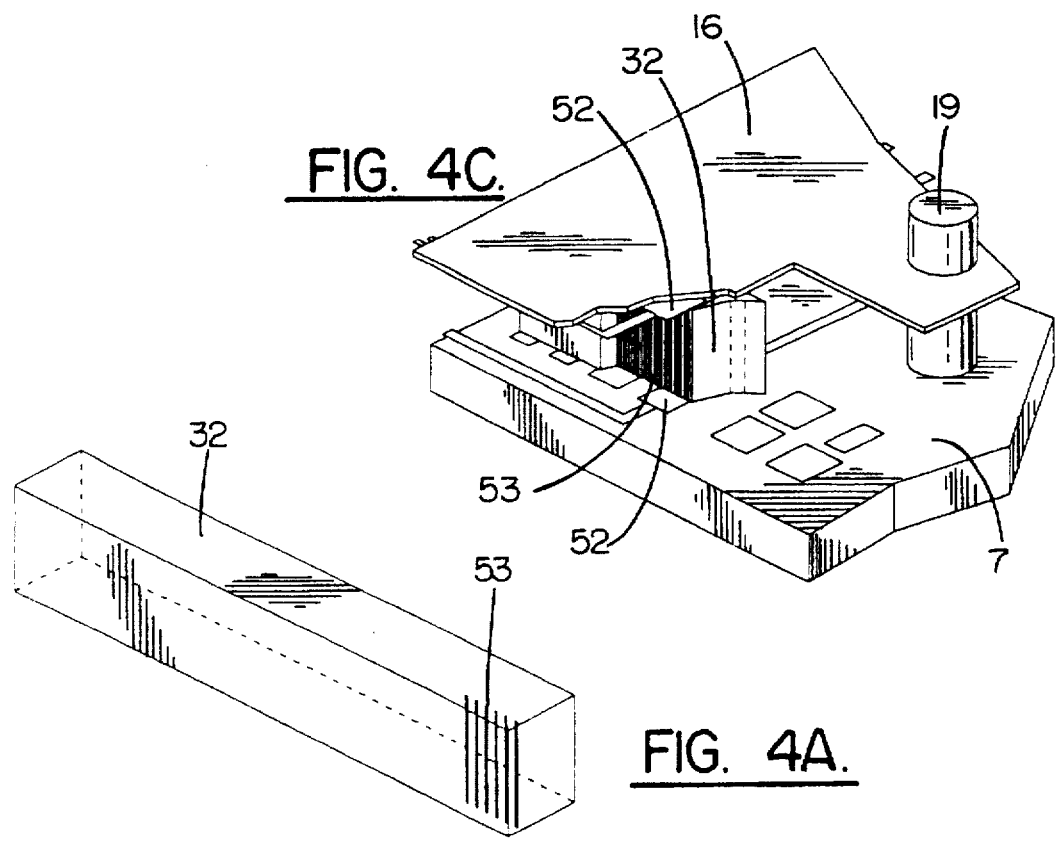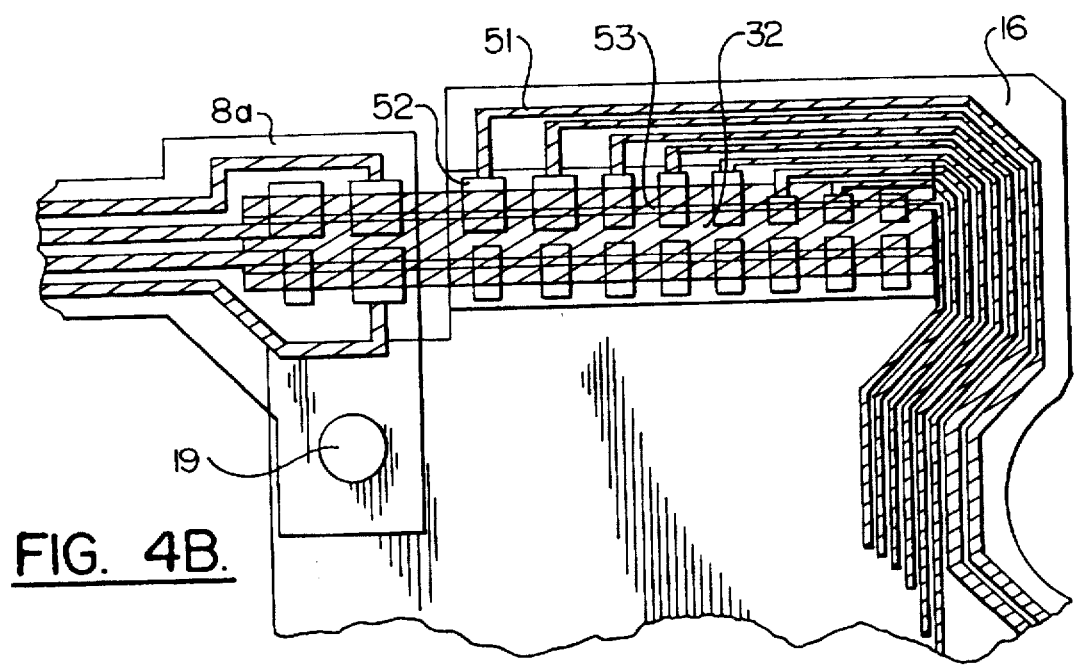

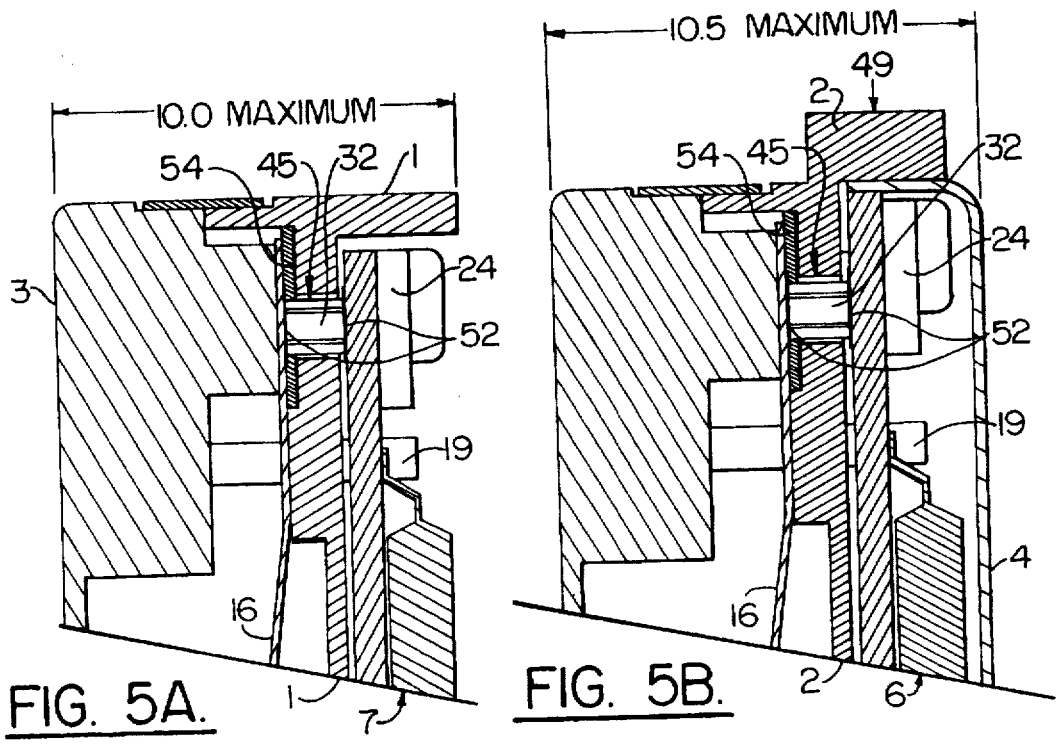
FIG. 5A.
FIG. 5B.
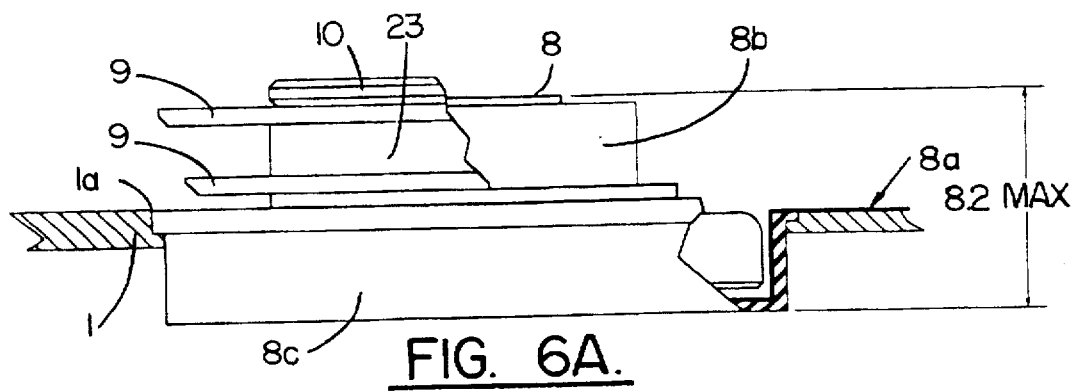
FIG. 6A.
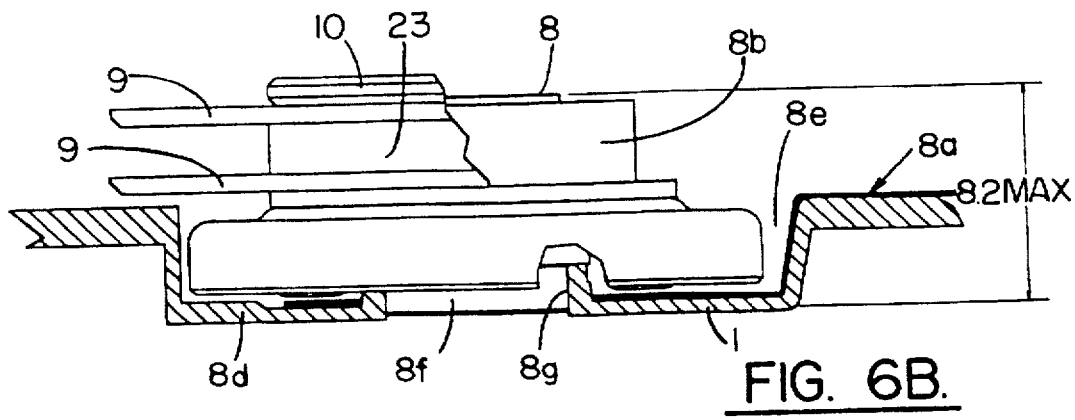
FIG. 6B.

| Block No | Function |
|---|---|
| IC1 | Pre-amplifier |
| IC2 | Data channel |
| IC3 | Mixed signal ASIC |
| IC4 | Micro-processor |
| IC5 | Flash EEPROM |
| IC6 | Interface |
| IC7 | RAM |
| IC8 | Motor/VCM driver/controller |
| IC9 | Interface (PCMCIA) |
| P1 | Elastomeric connector |
| P3 | 68 way connector |

MINIATURE HARD DISK DRIVE SYSTEM

The present invention relates to a miniature hard disk drive system whose physical dimensions are similar in area or 'footprint' to a normal credit card but somewhat greater in thickness.

BACKGROUND OF THE INVENTION

An important impetus behind the invention is the increasing miniaturisation of portable personal computers coupled with the requirement by the computer industry to establish standards for the connectivity and usage of peripheral devices. Over recent years, the typical desktop PC has increased steadily in performance as both hardware and software have developed. The need for portability of the PC led to the introduction in the middle to late 1980s of the laptop PC, a significant milestone in the computer industry. Despite its initial attraction of portability, major problems with this machine were (and still are) its weight, size and power consumption. One factor, among several, contributing to its problems was the hard disk drive needed for the laptop. This was initially a '3.5 inch' drive weighing typically 1.8 lbs and consuming 15 Watts. This device alone precluded any serious claim that the computer was battery operated. Subsequent laptop developments have included the use of the smaller, lighter and less power consumptive 2.5 inch hard drive and have resulted in the introduction of notebook computers. These machines have a typical A4 footprint (8×11 inches) but weigh around 6 lbs which is still uncomfortably heavy. Battery operation and life have improved in parallel but are still generally unsatisfactory. Variants of these machines using pen-based input capability have been developed but for them the issue of weight is critical.

The most recent advances in this field centre around so-called 'sub-notebook' computers. These are generally in the development stage at present. They are smaller again than notebooks, weigh perhaps only 2 1 lbs but are targetted to have the performance capability of notebooks, with full keyboard, back lit screen and full disk operating system. Longer battery life is an objective. Clearly for this type of computer it is important to provide a memory storage device that is physically small, very light, has very small power requirements but can store amounts of data comparable to those on a typical 2.5 inch disk drive, say greater than 60 MB (Megabytes). Semiconductor memory cards, such as 'Flash' cards, meet certain of these requirements but critically fail to meet the storage capacity requirements. They are used in various related applications where mass storage is less important and they conform to certain standards of interchangeability, interface etc. In particular, PCMCIA (PCMCIA refers to Personal Computer Memory Card International Association) has established standards for memory card connectors, pin-out, interface protocol, physical size, sockets etc. To date, these fall within categories defined as Types I and II. Type I, for example, defines a 3.3 millimeter (mm) thick read-only memory card. Type II refers to a read-write card which is 5.0 mm thick. The latest PCMCIA standard is Type III which is specifically aimed at mass storage devices of thickness 10.5 mm. It is this standard which is increasingly being adopted by certain designers and potential manufacturers of sub-notebook computers and there is a need for a practical and economic device which can meet the physical constraints imposed by this standard whilst at the same time providing storage capacities of the order of that indicated above. Other attempts that have been made to reduce the size and in particular the thickness of hard disk drives to try to meet such standards have had to resort to expedients such as omitting a head flexure assembly so that only three out of the four surfaces of a two-disc hard drive can be used. Such an approach is quite unsatisfactory since it substantially reduces the maximum storage capacity of the disk drive which is particularly undesirable in the light of the relatively large size of much modern software and the increased use of large datafiles for a number of applications.

It is an object of the present invention to avoid or minimize one or more of the above disadvantages. Thus the present invention seeks to respond to this situation by providing a miniature disk drive that is ideally suited to the requirements of sub-notebook computers. The basic drive of the invention has two preferred versions, the first being a fixed drive for including within the computer, the second being a removable drive that is substantially, preferably fully, compatible with the PCMCIA Type III standard. Both versions can offer storage capacities of up to 80 MB or more in a credit-card size of package roughly one third the physical volume of a typical so-called '2.5 inch' hard disk drive but offering equal or greater performance and similar storage capacity, weighing as little as 65 grams or less e.g. 60 grams or less, and consuming typically of the order of one Watt of power on average. The actual power consumption will of course depend on the application and mode of usage but compares favourably with that of larger hard disk drives which have comparable data storage capacity.

A first object of the present invention is to provide a miniature hard disk drive with a footprint similar to that of a credit card and with high performance and data storage capability.

A second object of the present invention is to provide an improved hard disk drive system in which the size, weight, power consumption and susceptibility to mechanical shock, vibration and handling are minimised without adversely affecting performance and data storage capability such that the overall system is particularly suitable for use both as a separately portable data storage device and as a fixed data storage device with wide application particularly in lightweight portable computers, including for example, sub-notebook computers.

A third object of the present invention is to provide a miniature removable hard disk drive with performance features similar to typical '2.5 inch' or '3.5 inch' hard disk drives.

A fourth object of the present invention is to provide a miniature hard disk drive that can store at least 40 MB of formatted data per disk.

A fifth object of the present invention is to provide a miniature hard disk drive system that is compatible with 2.5 inch and 3.5 inch hard disk drives in its interfacing with computer systems.

A sixth object of the present invention is to provide a miniature hard disk drive system that interfaces with computer systems by means of the standard 68-pin PCMCIA (Personal Computer Memory Card International Association) connector.

A seventh object of the present invention is to provide a miniature hard disk drive system that is compatible with PCMCIA Type III dimensions and 68-pin connector. These dimensions are 10.5 mm thick, 54 mm wide and 85.6 mm long.

An eighth object of the present invention is to provide a miniature hard disk drive system in which electrical connection between the head-disk assembly and the main printed circuit board is effected by means of a compact connector system which uses up a minimum area of the main printed circuit board.

A ninth object of the present invention is to provide a miniature hard disk drive system in which two disks can be fitted into the head disk assembly within an overall drive thickness including the main printed circuit board assembly (PcBA) of as little as 10.0 mm.

One or more of the above objectives can be achieved or substantially facilitated by providing a compact elastomeric connector system connecting the main PcBA (printed circuit board assembly) and the flexible circuit means contained within the head-disk assembly thus occupying a small dimensional volume and minimizing the connector area on the main pcb.

In one aspect the present invention provides a miniature disk drive system comprising: a substantially sealed enclosure, housing a head disk assembly, and an attached printed circuit board assembly, togeher having a total combined thickness not exceeding 10.5 mm; said head-disk assembly having at least two miniature hard disks each having an outer diameter of from 40 to 50 mm; support means for rotatably supporting said miniature hard disks within said enclosure; rotary drive motor means for rotating said miniature hard disk; head flexure assembly means having read-write head means for writing digital information to and reading digital information from each surface of each of said miniature hard disks; actuator assembly means for pivotally supporting and positioning said head flexure assembly means for writing digital information to and reading difital information from different parts of said disks; and electronic circuit means for implementing the operation of said hard disk drive system arranged substantially on a single printed circuit board assembly means, which printed circuit board assembly means is mounted on a planar side of said sealed enclosure.

In another aspect the present invention provides a miniature disk drive system comprising: a substantially sealed enclosure housing a head-disk assembly and attached printed circuit board assembly means mounted on a planar side of said head-disk assembly, characterized in that said printed circuit board means has first contact pad means and said head-disk assembly has a flexible circuit means with a first flexing portion connected to an actuator assembly means for electrical connection to read-write heads, and having a second portion with second contact pad means, and said head disk assembly having a side wall means at said planar side thereof which has an aperture, mounting a miniature elastomeric connector means for interconnecting corresponding contact pads of said first and second contact pad means disposed at opposite sides of said aperture for data transmission between the read-write head means and the printed circuit board means.

In a further aspect the present invention provides a miniature disk drive system comprising: a substantially sealed enclosure housing a head-disk assembly and attached printed circuit board assembly means together having a total combined thickness not exceeding 10.5 mm; said head-disk assembly having at least two miniature hard disks each having an outer diameter of from 40 to 50 mm; support means for rotatably supporting said miniature hard disks within said enclosure; rotary drive motor means for rotating said miniature hard disks; head flexure assembly means having read-write head means for writing digital information on and reading digital information from each surface of said miniature hard disks; actuator assembly means for pivotally supporting and positioning said head flexure assembly means and allowing said read-write head means to write digital information to and read digital information from said disks; and electronic circuit means for implementing the operation of said hard disk drive system arranged substantially on said printed circuit board means, which printed circuit board means is mounted on a planar side of said head-disk assembly, said printed circuit board means having first contact pad means and said head-disk assembly having a flexible circuit means with a first flexing portion connected to said actuator assembly means for electrical connection to read-write heads, and having a second portion with second contact pad means, and said head disk assembly having a side wall means at said planar side thereof which has an aperture, mounting a miniature elastomeric connector means for interconnecting corresponding pads of said first and second contact pad means disposed at opposite sides of said aperture for transmission between the read-write head means and the printed circuit board means.

The miniature hard disk drive of the present invention was developed primarily for use in very small portable computers, that is, so-called sub-notebook computers which can operate in a similar way to larger notebook, laptop or desktop computers. Compared to these larger computers, the sub-notebooks can have similar operating system software and the need for equivalent hard disk drive performance. The miniature hard disk drives of the present invention can provide levels of performance comparable to those of existing 2.5 inch and 3.5 inch hard disk drives but are significantly smaller, lighter and consume less power, thus making long life battery operation of small computers a reality. In particular, comparable data transfer rates, access times, error rate performance, and storage capacities of up to 60 MB or more, preferably at least 80 MB, advantageously around 120 MB or more, can be achieved in the drives of the invention within a restricted overall drive thickness, with battery life similar to or better than in comparable applications.

There are two main preferred forms of disk drive within the scope of this invention. One preferred form is a fixed, non-removable drive for mounting within a computer or other system. The other preferred form is a removable device, rather like a cartridge or a memory card. Both principal embodiments of this invention are based on and can use a substantially similar head-disk assembly, that is, the sealed enclosure containing the magnetic read-write heads, the magnetic disk(s), spindle motor hub for supporting and rotating the disk(s) and an electronic cicuit means containing a data signal pre-amplifier. The main external electronic boards for both preferred forms may be essentially identical with the exception of the external connector, which is different depending on whether the drive is fixed or removable. Another difference between the preferred forms is the overall shape and appearance. The removable version is designed to meet the specific dimensional requirements of PCMCIA Type III mass storage devices.

Elastomeric connectors generally comprise blocks of resiliently deformable natural or synthetic electrically insulating polymer e.g. silicon rubber, with a plurality of spaced-apart conductors in the form of electrically conducting filaments or other elongate bodies or zones extending from one side to another e.g. gold or nickel wire and electrically conducting material such as carbon or silver doped elastomers. In accordance with the present invention there is used on the one hand a very compact form of elastomeric connector with a thickness (conductor length) of the order of less than 3 mm e.g about 1.8 mm and conductor pitch less than 0.5 mm, preferably 0.1 mm, advantageously around 0.05 mm to provide on the other hand a relatively large number of connections at least some of which carry relatively high current levels. Indeed in a preferred form of the invention substantially all the connections required between the PCBA and the motor and other circuitry within the head disk assembly (including those such as to the motor which have relatively high current requirements)—which may involve up to 20 or more connections—are made via a single very compact elastomeric connector. This presents considerably more severe requirements on the elastomeric connector than have previously been attempted, earlier applications involving only a small number of low current connections e.g. to LCD displays. By utilizing a pitch substantially smaller e.g. at least 5 times, preferably at least 10 times, smaller than that of the contact pads on the main pcb and the flexible pcb, it is possible to maximize the conducting pathways between the respective contact pads whilst avoiding shortcircuiting and reducing the need for precise positioning of the elastomeric connector relative to the contact pads, though of course some care still needs to be taken in aligning the two sets of contact pads relative to each other depending on the interpad spacing. In accordance with the present invention this may conveniently be achieved with just a single locating pin means on the base plate (planar side wall means). Conveniently there is used an elastomeric connector with a large plurality of regularly spaced conductors with a pitch substantially less than that of the contact pads of the first and second contact pad means so that an adequate conducting pathway can be provided between each pair of respective pads via a number of conductors without the risk of short circuits between laterally adjacent pads as a result of slight misalignment of the contact pad means and/or the elastomeric connector.

In general the contact pad means are disposed at a pitch in the region of from 0.2 to 1 mm though it should be understood that there is no particular criticality in this area. Preferably there is used an inter-pad spacing not less than the width of the narrowest pad and desirably the elastomeric connector conductor pitch is at least 2 times less than the inter-pad spacing. In order to help ensure positive electrical contact between the connector conductors and the contact pads, the ends of the conductors may be formed so as to project slightly e.g. around 0.01 mm, from the insulating polymer block at each side thereof, though this is not normally necessary.

In order to accommodate more readily the connector and the flexible connector contact pads within a compact area whilst using a reasonably large contact pad width and pitch, the contact pads are advantageously arranged in two (or more) parallel rows. The elastomeric connector is correspondingly provided with two (or more) parallel elongate arrays of conducting zones or pathways. In a preferred form of the invention the contact pads have a width of around 0.4 mm and are arranged at a pitch of around 0.8 mm providing an interpad spacing of around 0.4 mm. The width of the parallel rows of contact pads is around 0.8 mm and the spacing between the rows around 0.2 mm.

By maintaining a reasonable width of contact pad and separation, the criticality of the size and arrangement of the conductor pathways in the elastomeric connector, as well as the criticality of the alignment of the first and second contact pads with each other, are significantly reduced thereby considerably facilitating manufacture and improving reliability. Even so it will be appreciated that it is important to avoid any possibility of misalignment arising from significant lateral deformation and/or displacement of a greater or lesser part of the elastomeric connector 32 when this is compressed between the PCBA 7 (or 6) and flexible circuit 16 in the course of assembly of the HDA. Accordingly the aperture 45 in the baseplate 1 through which the elastomeric connector 32 extends is desirably formed and arranged to be a relatively close fit around the connector 32 and have a substantial depth so as to provide substantial lateral support thereto whilst accommodating a limited degree of lateral expansion associated with the axial compression of the elastomeric connector 32. The preferred aperture dimensions will depend on inter alia the physical properties of the elastomer used and the degree of compression required to achieve good electrical contact at each end thereof. Typically though the aperture 45 has a depth corresponding to at least 70% of the depth of the connector 32 in its uncompressed form and a lateral width of from 5 to 30% greater than that of the connector 32 to allow for lateral expansion of the elastomeric connector when this is compressed between the first and second contact pad means 52. In general the parts of the system are configured and dimensioned so that the elastomeric connector is subject to a depth compression (axially of the conductors 53) of around 5 to 20% e.g. about 11%. In order to position the elastomeric connector within the mounting aperture 45 prior to compression, the aperture 45 is preferably provided with a plurality of spaced apart radially inwardly extending locating protections. These extend into more or less close proximity to the sides of the uncompressed elastomeric connector, preferably opposite inter-contact pad spaces in order to minimize the possibility of deformation or distortion of conductors used to interconnect contact pads of the first and second contact pad means. In general it may be noted that failure to provide a suitable expansion clearance leads to distortion of the elastomeric connector and the conductors therein to a greater or lesser extent with the risk of misalignment of connections between the first and second contact pad means and/or breakdown of the conductors and other consequential problems.

It has been found that this form of connector can provide satisfactory performance in the very critical high speed data transmission between the HDA and the main electronic circuit means, as well as the higher current supplies to the main drive motor and the motor controlling movement of the head flexure assembly means all within a very compact area thereby avoiding the need for conventional multi-pin connectors. Dispensing with multi-pin connectors results in various benefits including reducing inter alia the overall thickness of the complete assembly, by avoiding the use of connection pins which extend through to the far side of printed circuit board thereby also freeing space on that side for other uses, as well as significantly reducing manufacturing costs and ease of assembly providing substantial savings both in thickness and circuit board area requirements which in turn helps the overall volume of the disk drive to be reduced.

In order to facilitate the accommodation of two disks and head flexure assembly means for each of the disk surfaces, along with a rotary drive motor means for the disks, within an overall drive thickness of not more than 10.5 mm, the printed circuit board means advantageously has an aperture formed and arranged for receiving therein part of said rotary drive means. With such an arrangement it has been found possible to accommodate rotary drive means suitable for high performance driving of the disks as further detailed herein below.

Thus in a further aspect the present invention provides a miniature disk drive system comprising: a substantially sealed enclosure housing a head-disk assembly and attached printed circuit board assembly means together having a total combined thickness not exceeding 10.5 mm; said head-disk assembly having at least two hard disks each having an outer diameter of from 40 to 50 mm; support means for rotatably supporting said hard disks within said enclosure; rotary drive motor means for rotating said hard disks; head flexure assembly means having read-write head means for writing digital information on, and reading digital information from, each surface of said hard disks; actuator assembly means for pivotally supporting and positioning said head flexure assembly means and allowing said read-write head means to write digital information to and read digital information from concentric tracks on the surfaces of said miniature hard disks; and electronic circuit means for implementing the operation of said hard disk drive system arranged substantially on said printed circuit board means, said printed circuit board means having an aperture for receiving therethrough an axially projecting part of said disk support means and/or said rotary drive motor means therefor.

The magnetic disks are conveniently mounted for rotation on the hub of a small DC spindle motor. In generally known manner, a so-called actuator assembly, containing, inter alia, a head-stack assembly consisting of two magnetic head flexure assemblies for each disk (one flexure assembly per disk surface), permits digital information to be written on and read from the surfaces of the disks. Each of the head flexure assemblies normally comprises a magnetic head (or transducer or slider) fixed to the end of a precision spring steel or like flexure. It is the head which magnetically records and reads back data from a disk surface. This information is normally written in the form of discrete tracks on each disk surface, these tracks being recorded at a high density e.g. at an approximate density of 2500 tracks per inch or greater.

The head flexure assemblies are fixed to the arms of a so-called E-block which is pivotally mounted on a ball bearing system. The E-block also holds the rotor of a small motor, called a voice-coil motor, and the whole actuator assembly is rigidly attached to the shaft of the voice coil motor. The actuator is electrically controlled to rotate through an arc between the innermost track and the outermost track, normally with a sweep angle of approximately 26 degrees. Accurate control of the actuator assembly with respect to precise location and following of each data track is effected by position feedback based on sampled data information laid down at regular intervals on every track. In general this sampled servo information is accurately recorded on each disk during manufacture of the drive and safeguards are built into the control systems of the drive to ensure that the servo information cannot be overwritten in normal operation. The voice-coil motor is generally designed to have characteristics of high mechanical stiffness and high torque and constancy of these parameters across its sweep angle. In addition, the voice coil motor is normally designed to provide a very low inductive time constant in order to provide fast acceleration and tight speed control of the head-stack assembly thereby achieving fast seeks between tracks.

Given the current state-of-the-art in hard disk drive magnetic recording it is feasible to store data at an areal density of around 120 million bits per square inch. Considering the usable area on a 48 mm diameter disk it is therefore possible to store around 40 MB of formatted data on each such disk. In order to meet the general data storage requirement of 60 MB minimum, two 48 mm disks are fitted within the HDA. These are supported on the rotatable hub of a suitable motor which preferably is a small three-phase brushless DC spindle motor, whose stator is contained in a housing which projects axially outside one planar side of the HDA. This motor rotates at high speed, conveniently about 4800 rpm and commutation is generally effected from continuous monitoring of the back-emf developed across each winding.

The speed of the motor is controlled to high precision, typically better than 0.5%. Electrical signals to and from the heads and motors within the HDA are normally routed via a flexible circuit, on part of which is conveniently mounted a head select and pre-amplifier integrated circuit, wholly contained within the HDA. Connection of this flexible circuit to the main electronics circuit board (which normally contains all the hard disk drive functions which are not required or not desirable to be within the HDA) outside the HDA is effected by means of the 'elastomeric' connector, as described above. The elastomeric connector is mounted in a sealed 54 aperture in a planar side wall of the HDA (i.e. a wall parallel to the principal plane of the disk drive which in the case of horizontal mounting of the disk drive may be at the base thereof) being sandwiched under pressure between first contact pads on the main electronics printed circuit board and second contact pads on the flexible circuits, when the circuit board is located and fastened into place against said planar side wall of the HDA. The PCMCIA Type III version of the drive is designed to be mechanically suited for ease of removability. In particular, the HDA includes integral guide rails, support features for the connector and a protective cover, usually metal, over the printed circuit board. Overall, this arrangement adds considerable stiffness and resilience to the removable drive, which will experience rougher handling than the fixed version. In general, the over-riding objective of achieving dimensional compatibility with the PCMCIA Type III standard places very severe constraints on the physical size on the drive, in particular the height (measured on an axis perpendicular to the surface of the disks). In one embodiment of the invention, taking the PCMCIA Type III standard as a reference, the drive has two disks within a basic HDA height of around 7 mm, with approximately a further 3.3 mm used for the printed circuit board and its protective cover thus meeting the maximum height restriction of 10.5 mm for the whole drive.

The electronics of the circuit means on the printed circuit board of the miniature hard disk drive of the present invention desirably utilize high level integrated circuits (ICs) with the entire control circuitry, excluding the pre-amplifier which is located within the HDA, being contained on a single printed circuit board. The primary functions of the basic drive (that is independently of the actual interface connector) may be implemented through the use of around seven or eight ICs, namely: data channel IC, motor speed control IC, microprocessor, interface IC (one for a fixed drive or two for a removable drive), RAM, ROM and a custom designed ASIC (Application Specific Integrated Circuit). With the exception of the ASIC, these ICs are proprietary components available within the industry and are generally used in the present invention as 'SQFP' (Small Quad Flat Pack) packages. It should be appreciated that virtually all of the drive functionality can be controlled by on-board software in approximately 32K bytes of program code (including routines for self-test of the drive during the production phase). Movement and positioning of the read-write heads within the servo system may be substantially controlled by software by means of analog-to-digital converters and a separate digital signal processor residing within the main microprocessor. This provides an efficient and self-calibrating capability.

Further preferred features and advantages of the invention will appear from the following detailed description given by way of example of two preferred embodiments illustrated with reference to the accompanying drawings.

BRIEF DESCRIPTION OF THE DRAWINGS

FIG. 2A is a view similar to FIG. 1A of a PCMCIA Type III compatible drive embodiment with the cover removed;

FIGS. 2B and 2C are corresponding views of those of FIGS. 1A and 1B, of the drive of FIG. 2A;

FIG. 2D is a detail view corresponding to FIG. 2A of a similar embodiment with an alternative form of motor;

FIG. 4A is an enlarged perspective view of the elastomeric connector of the drives of FIGS. 1 and 2;

FIG. 4B is a plan view of the flexible circuit of the HDA of the drive of FIGS. 1 and 2, and its connection to the elastomeric connector;

FIG. 4C is a partial perspective view of the drive showing the mounting of the connector;

FIGS. 5A and 5B show a transverse cross section through the drives of FIGS. 1 and 2; in the area of the elastomeric connector;

FIGS. 6A and 6B show alternative forms of the motor of the drives of FIGS. 1 and 2;

DESCRIPTION OF THE PREFERRED EMBODIMENTS

This description covers two models of disk drive: the fixed ATA-IDE unit and the removable PCMCIA version. There are substantial similarities between these drives both within the HDA and in the electronics. One visual difference is in overall appearance. The two versions are built on different baseplates. The PCMCIA baseplate includes integral guide rails for ease of location and use in a Type III receptacle, support features for the connector and means for attaching a cover over its PCBA. Additionally the PCMCIA drive uses a different PCBA.

The fixed version of the hard disk drive interfaces to a host system by means of a 50-pin connector using the electrical interface defined by the ATA-IDE industry standard. ATA-IDE refers to Advanced Technology Attachment—Integrated Device Electronics. The removable version of the drive interfaces to the host system by means of a 68-pin connector, approved by PCMCIA, but uses an ATA-IDE electrical interface with modified pin assignment. A further embodiment of the removable version will interface to the host system by means of the same 68-pin connector but meeting the electrical interface defined by the evolving PCMCIA-ATA industry standard.

The following description applies to the fixed drive in the first instance. Where differences exist in the PCMCIA version they are described separately.

Figure 1A:
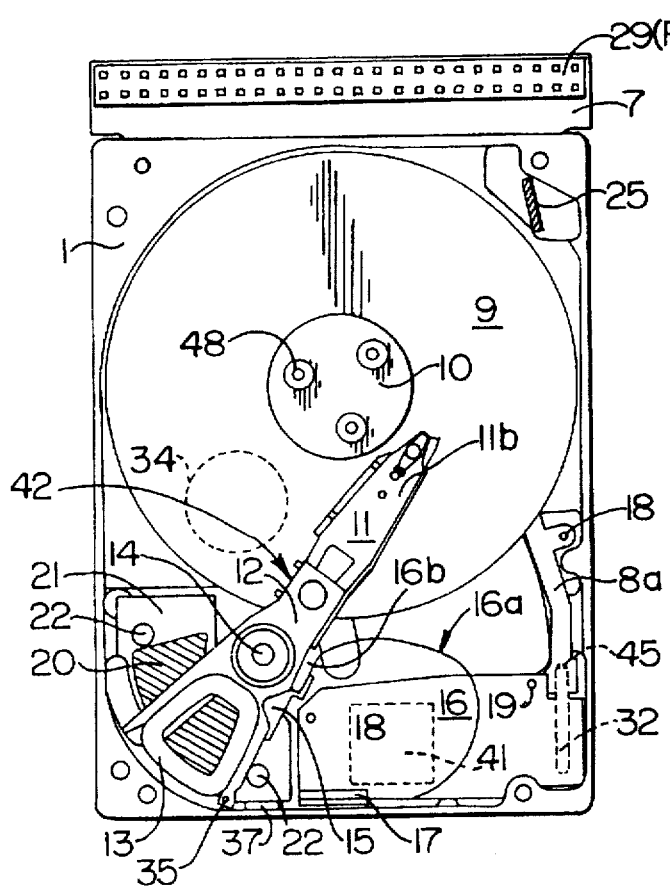
FIG. 1A is a plan view of a fixed drive assembly embodiment with the cover and a magnet plate removed to show the internal parts of the disk drive.
Figure 1C:
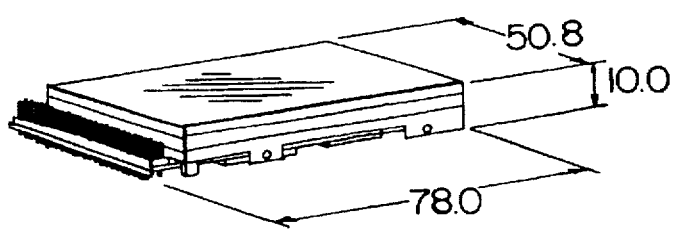
FIG. 1C is a perspective view showing the overall outside dimensions of the drive of FIG. 1A.
Figure 1B:
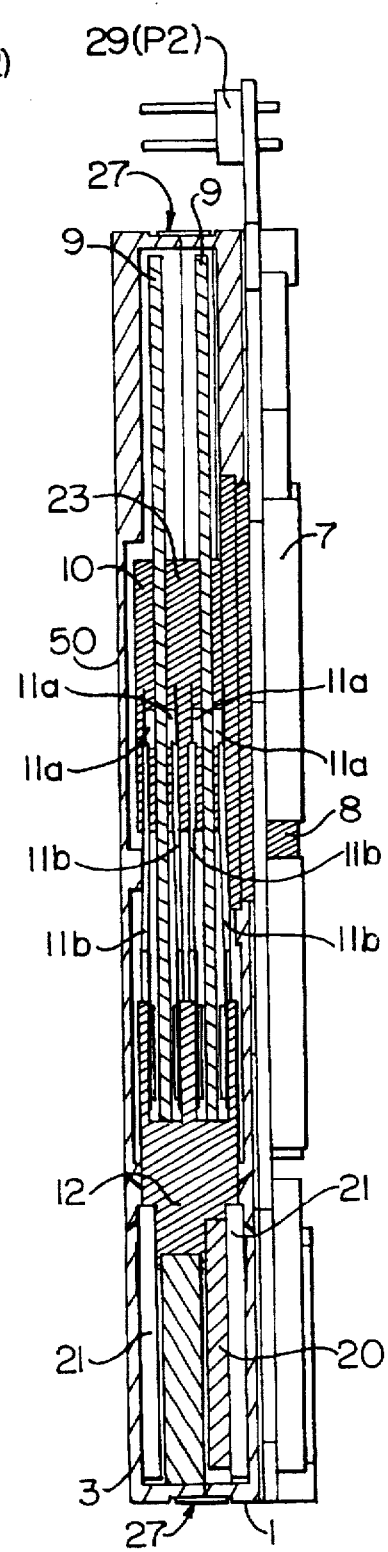
FIG. 1B is a cross section through the drive of FIG. 1A to a larger scale.

The fixed version of the hard disk system is shown in FIGS. 1A, 1B and 1C. The main magnetic and rotational elements of the drive are entirely contained within a sealed enclosure known as a head disk assembly (HDA) comprising a baseplate 1 and a cover 3. FIG. 1A shows a plan view of the HDA with the cover 3 removed. The major components consist of a rotatable stack assembly of magnetic disks 9 fixed to the hub of a small spindle motor 8, and an actuator assembly 42 holding a head-stack assembly of read/write head flexure assemblies 11 at one end and the coil 13 of a precision fixed angle 'voice-coil' style motor assembly at the other. Each head flexure assembly 11 consists of a small so-called "50%" magnetic transducer or slider 11a attached near one end of a spring steel flexure 11b, the method of attachment and the geometry of the flexure again providing "gimbal" operation for the slider 11a i.e. for movement thereof both across the disk surface and perpendicular thereto.

Figure 3:
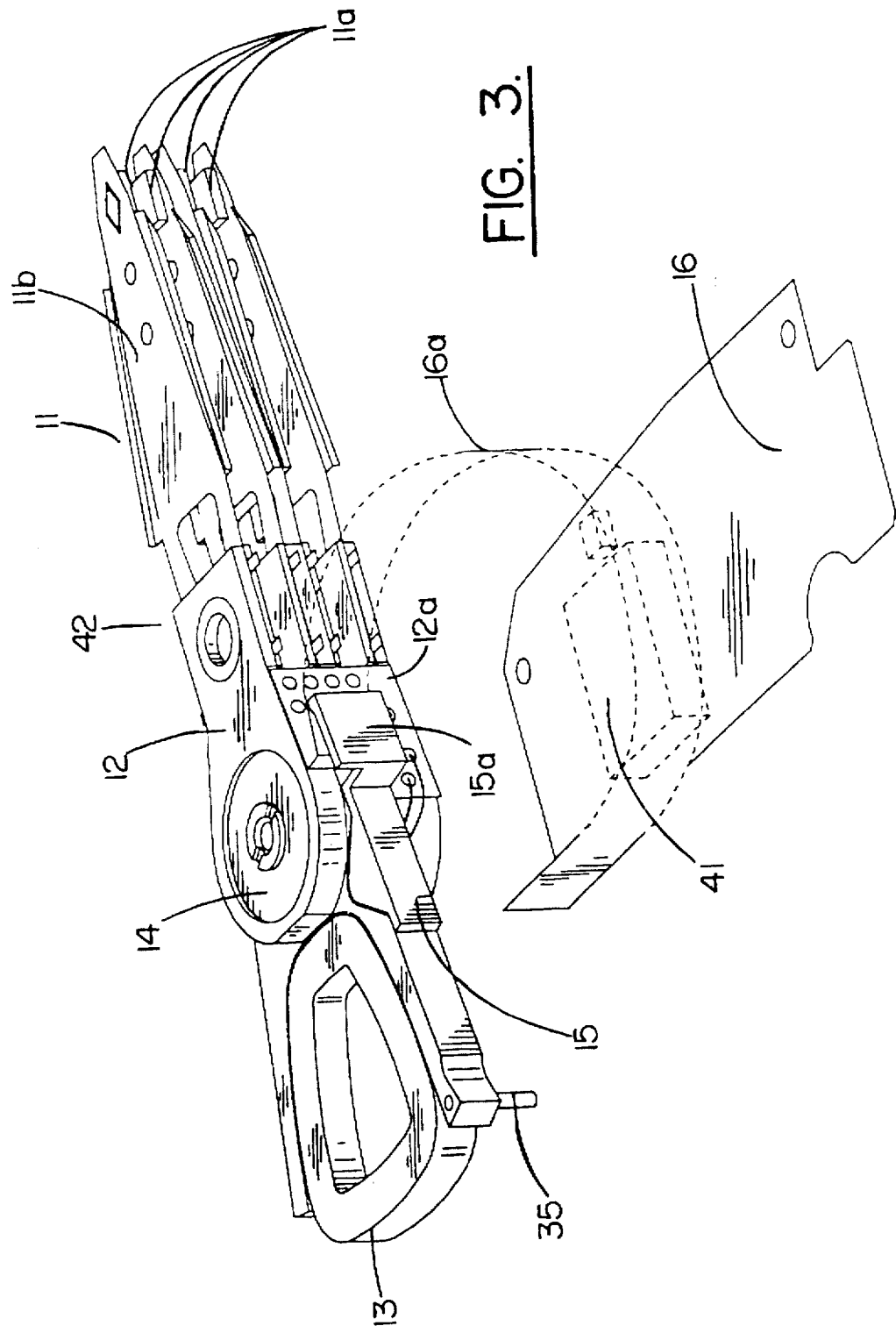
FIG. 3 is an enlarged perspective view of the actuator assembly of the drives of FIGS. 1 and 2.

In operation, the disks 9 rotate at 4800 revolutions per minute and each slider 11a "flies" in stable fashion on an air bearing above its adjacent disk surface at a height of typically 3 to 4 microinches, permitting it to write data to and read data from the disk surface. The radial position of the actuator assembly 42 is controlled by the action of the voice-coil motor 13, 20, 21. The use of 50% sliders 11a in conjunction with the style of flexure 11b allows a back-to-back arrangement of head flexure assemblies 11 which permits operation with a disk-to-disk spacing of 1.92 mm (see FIG. 3). Each disk is nominally 48 mm in diameter and 0.635 mm thick being formed from aluminium or glass. The disk surface consists of a hard magnetic layer based primarily on cobalt, typically 2 microinches thick, with a coercivity of the order of 1600 Oersted, suitable for magnetic recording at a typical density of 120 million bits per square inch.

A sealing gasket 27 is applied axially at the join between the baseplate 1 and the cover 3. Pressure variations due to changes in the external environment are accommodated by the inclusion of a breather filter 34 located in the baseplate 1 under the disks 9 which allows internal air pressure to equalise while maintaining the clean internal conditions. During normal operation of the drive an internal air filter 25 continuously purges the internal air during the lifetime of the drive, airflow through it being generated by pump action resulting from the rotation of the disks 9. The base 1 and cover 3 are designed with relatively thin wall sections in certain important places. For example, the thickness of the cover 3 over a small circular area 50 located immediately above the axis of the disk stack assembly is nominally 0.4 mm. Because this area 50 is relatively small the overall stiffness of the cover 3 is only slightly reduced and the arrangement directly assists in achieving the target height of the HDA. The use of light magnesium alloy in die-cast form is appropriate for the base and cover and makes a significant contribution to achieving a total drive mass, including electronics, of only 55 grams or so (and around 65 grams for a corresponding removable drive embodiment). This is very important for the designers of portable computers.

The actuator assembly 42 is used to position the heads over the disks. It is shown in isometric view in FIG. 3. This assembly is mounted onto the baseplate 1 by means of a ball bearing cartridge assembly 14 bonded into a so-called E-block 12, allowing the assembly to rotate through an angle of about 26 degrees. The E-block is also preferably formed from magnesium or aluminium alloy. This motion is limited by two ends stops 22 pressed into the baseplate 1. The head-stack assembly supports two magnetic read/write head flexure assemblies 11 per disk 9, each head flexure assembly being fixed to the E-block 12. In the Figures, a total of four head flexure assemblies are shown operating on two disks. Included in the actuator assembly 42 is part of the voice-coil motor, namely a coil 13, bonded to the E-block 12. In operation, this coil is suspended in conventional manner in a strong magnetic field sustained by two permanent magnets 20 and two magnet plates 21, one fixed to the baseplate 1 and the other fixed to the cover 3. When a current is passed through the coil, the latter experiences a force due to the presence of the axial magnetic field and because the actuator 42 is pivoted around the ball bearing assembly 14, this force creates a resultant torque which is used to rotate the actuator assembly and so permit the head flexure assemblies 11 to be positioned over the data tracks on the disks 9. The actuator assembly is statically balanced around the ball bearing assembly 14 i.e. is held in a stable equilibrium position when stationary. The voice-coil motor is designed to operate from a DC supply in the approximate range 3 to 5 Volts. When powered off, the actuator assembly automatically parks at the inner limit of its travel where no data is recorded and is retained in this position by a latch mechanism comprising a steel latch pin 35, fixed to the E-block 12, and a small permanent magnet assembly 37 fixed to the baseplate 1.

Signals from the disks 9 are read by transducer elements on the head sliders 11a and are conducted to the fixed pre-amplifier integrated circuit 41 through a flexible circuit assembly 16 attached at one end 16b (shown in bold outline), via an integral flexing portion 16a of the flexible circuit assembly 16, to the E-block 12 adjacent to the head flexure assemblies 11 and at its other end to the baseplate 1. As the head flexure assemblies sweep across the disk surface, the flexing portion 16A moves whilst still permitting conduction of electrical signals to and from the head flexure assemblies. This flexible circuit assembly also carries current to the coil 13.

As the actuator assembly rotates back and forth over the disk surfaces, so the dynamic region 16a of the flexible circuit continuously changes its shape. The flexible circuit assembly 16 is designed so as to minimize any bias torque applied to the actuator assembly and to withstand a lifetime estimated to be hundreds of millions of cycles, a cycle being any "to and fro" movement of the actuator assembly 42. These properties are achieved by careful consideration of the attachment points and shape of the dynamic region 16a of the flexible circuit, these being determined by a clip 15 fixed to the E-block 12 and a bracket 17 fixed to the baseplate 1. In more detail, the "dynamic" region of the flexible circuit i.e. that part which changes shape during movement of the actuator assembly, is of so-called "single-sided" construction i.e. has conductor tracks on one side only of a flexible insulator substrate (generally of a polyimide such as KAPTON (Trade Mark), so that the overall thickness of this dynamic region (including the insulating layer covering the conductor tracks) is minimized, generally to around 70 um. At each end 16b, 16c of the dynamic region 16a, of the flexible circuit 16, the thickness thereof is increased by means of an additional layer of the flexible plastics insulator, in order to increase the stiffness of those parts 16b, 16c.

The first stiffened end 16b of the flexible circuit 16 is secured to the side 12a of the E-block 12 of the actuator assembly and the dynamic region 16a extends therefrom around a generally U-shaped path (see FIG. 1A), being supported at the opposite side of the U-shaped path from the E-block, by abutment against the distal end 15a of the clip 15. Thereafter the dynamic region extends out into free space along an arcuate pathway towards the second stiffened end 16b of the flexible circuit 16, which end is supported by the bracket 17. Thus it will be noted that both the E-block side 12a and the bracket 17 have a generally tangentially supporting relationship with the dynamic region 16a of the flexible circuit.

In order to provide fast seek times between data tracks, a relatively high torque constant of 0.008 Newton metreAmpere is required from the voice coil motor assembly and is achieved by the use of high performance magnets 20 which typically provide 32 MGOe (mega Gauss Oersted) of magnetic energy. The actuator assembly 42 has a relatively small moment of inertia (approximately $2 \times 10^{-7}$ Kgm$^2$) and can achieve a one third stroke seek time (approximation of an average seek time) of around 12 msec (excluding settling time) using a current of approximately 0.1 A.

The flexible circuit 16 terminates after the pre-amplifier 41 in an array of gold plated contact pads which connect it through an elastomeric connector 32 to a similar mirror-image array of contact pads on the PCBA 7. FIGS. 4A to 4C shows aspects of this connector and its function. The elastomeric connector 32 comprises a block of silicon rubber which has conductor filaments 53 of typically gold, silver or nickel passing through from one side to the opposite side. These conductor filaments are arranged in multiple parallel rows along the length of the connector. FIG. 4A shows only a few filaments on one row for clarity. FIG. 4B shows the connector 32 located beneath the flexible circuit 16 and spindle motor flexible circuit 8a, the ends of conducting filaments 53 in contact with pads 52. Representative traces 51 to these pads on the flexible cicuits are also shown. As can be seen both in FIG. 4C and FIG. 5A, the connector is compressed between PCBA 7 and flexible circuit 16 such that the opposing contact pads 52 in the contact pad arrays are connected by multiple conductor filaments in parallel paths. The area of the pad and therefore the number of conductor filaments electrically connected thereto is determined by the current carrying requirement between opposing pads.

The connector 32 is located and fixed by clamping the flexible circuit 16, connector 32 and PCBA 7 between the cover 3 and a connector clamp 24 (see also FIG. 4a) located below the PCBA 7. The connector passes through an aperture 45 in the baseplate 1 and is sandwiched between the flexible circuit 16 under the cover and the PCBA 7 on the outside of the baseplate 1. Accurate registration of the flexible circuit 16 and the PCBA 7 to each other is important and is achieved by the use of a precision dowel 19 which is bonded or otherwise fitted into a reamed hole in the baseplate 1. Angular (secondary) location of the flexible circuit 16 is achieved by a second dowel 18 moulded as an integral part of the baseplate 1 or alternatively fitted into suitable hole therein. It should be noted that this connector 32 also provides connection of the spindle motor 8 through the spindle motor's own flexible circuit 8a in a manner identical to that described above. Not only is this type of connector a cost effective substitute for the more commonly used style of pin-header and receptacle, but, because it can be accommodated within the wall thickness of the baseplate, it allows a substantial saving of space in headroom and also in required area on the PCBA 7. Assembly costs are low due to the elimination of through-hole soldering on both the flexible circuit assembly 16 and PCBA 7.

Also shown in FIGS. 1A and 1B is a disk clamp 10, fixed to the rotatable hub of the spindle motor by one or more screws 48, and used securely to fix the disk(s) 9, in stack form, to the spindle motor 8. One or two disks may be fitted. In the case of a two disk stacked configuration, the disks are separated by a precision lapped spacer 23.

Figure 8A:
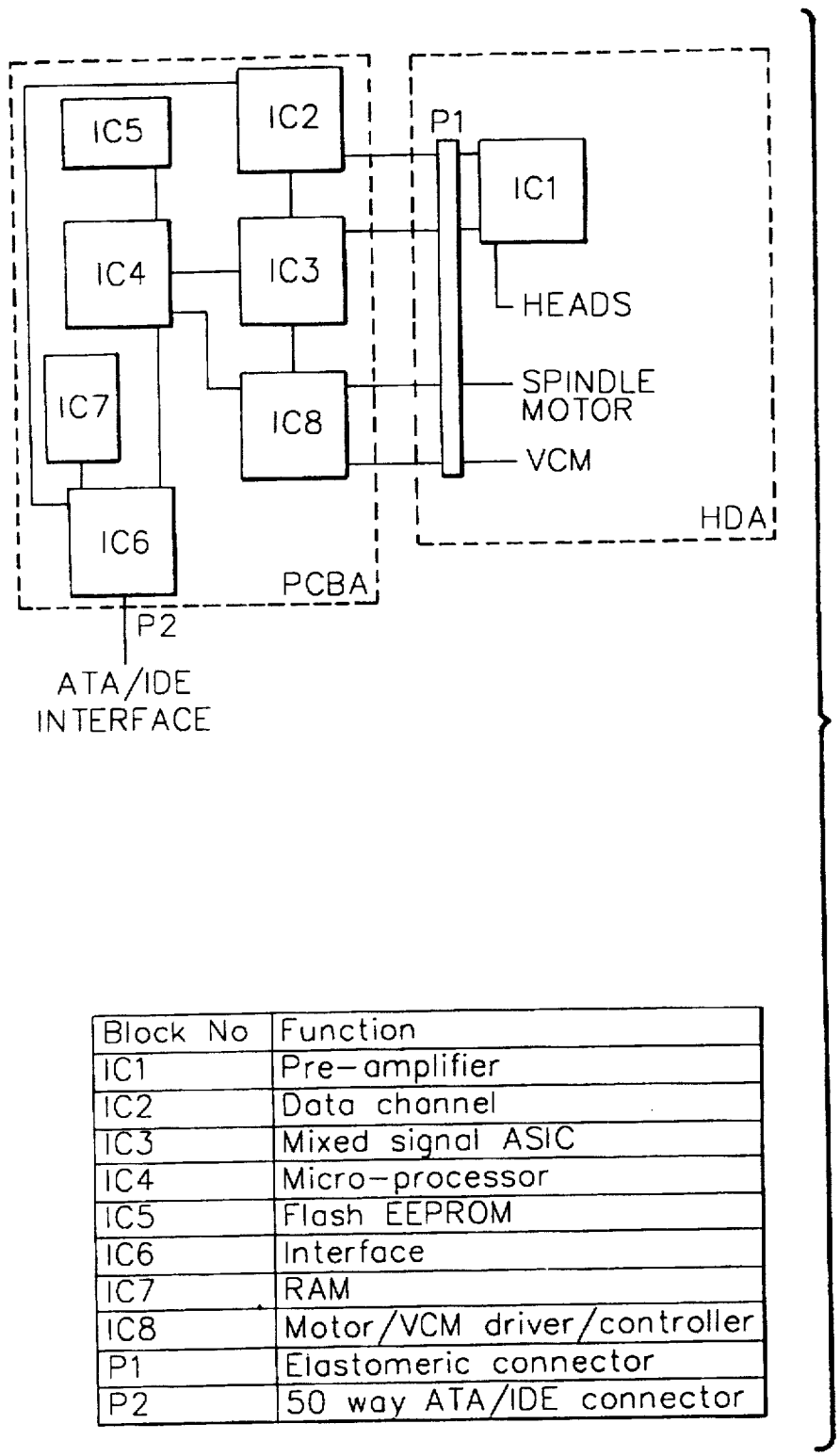
FIGS. 8A and 8B show block diagrams of the electronic circuit means of the drives of FIGS. 1 and 2.
Figure 8B:
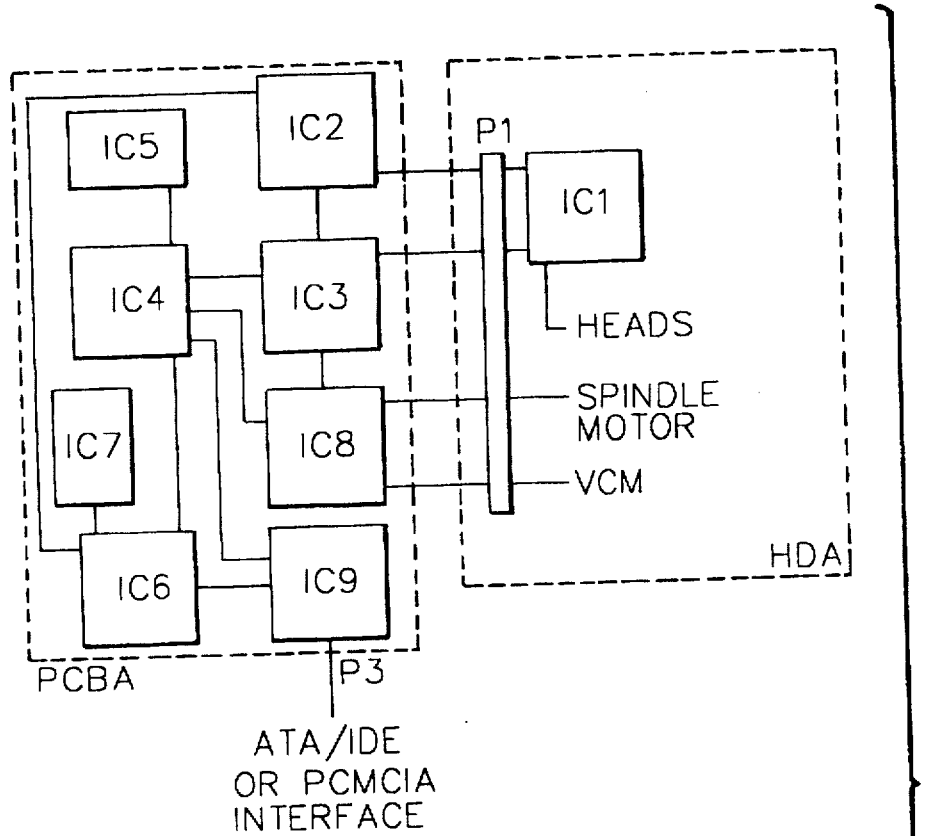
Figure 9A:
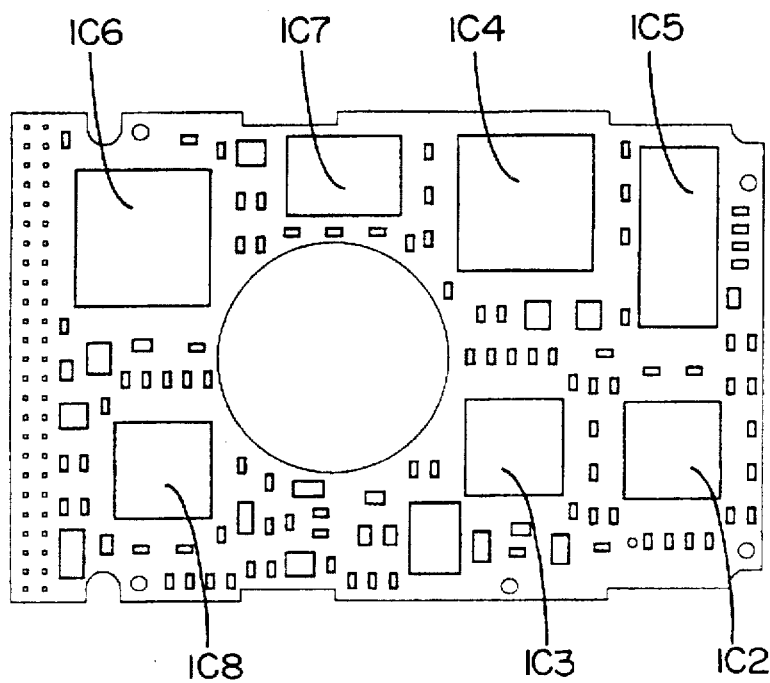
FIG. 9 shows the layout of the PCB for the fixed drive of FIG. 1.
Figure 9B:
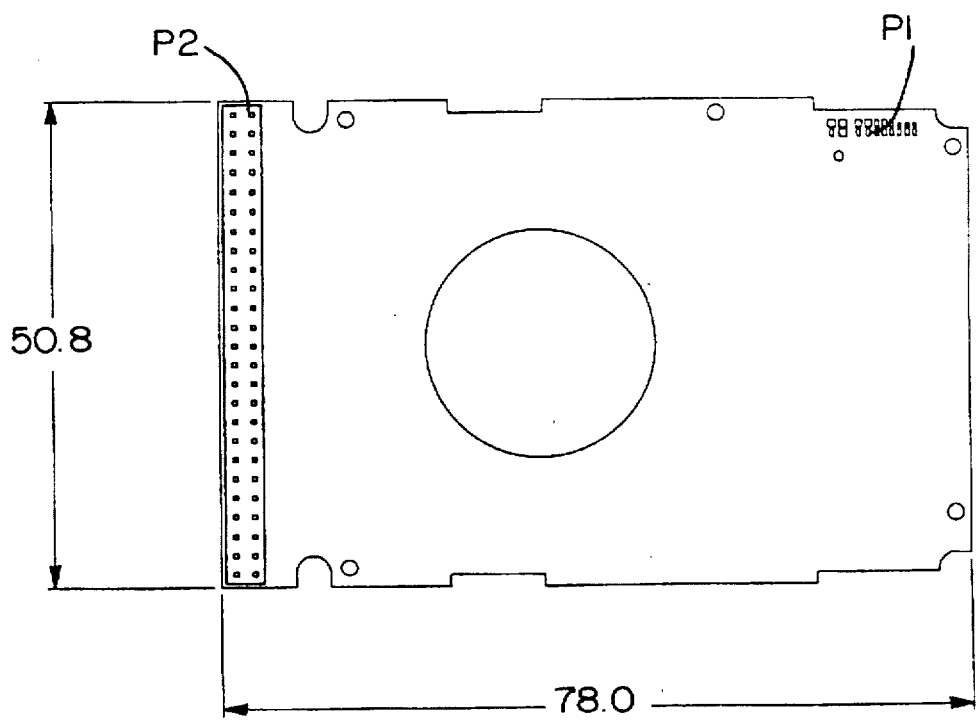
Figure 10A:
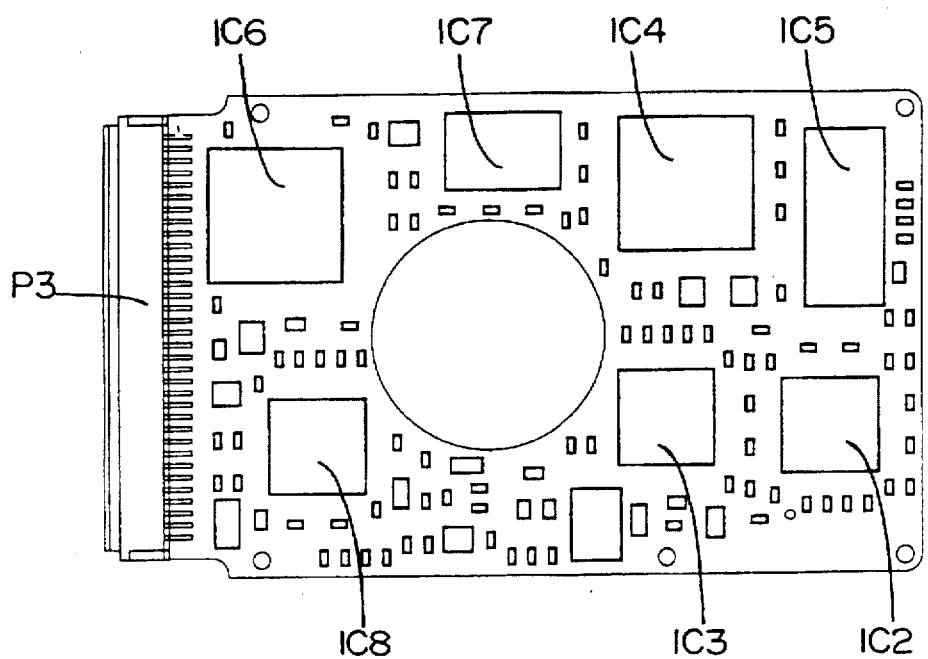
FIGS. 10 and 11 show alternative forms of the layout of the PCB for the PCMCIA Type III drive of FIG. 2.
Figure 10B:
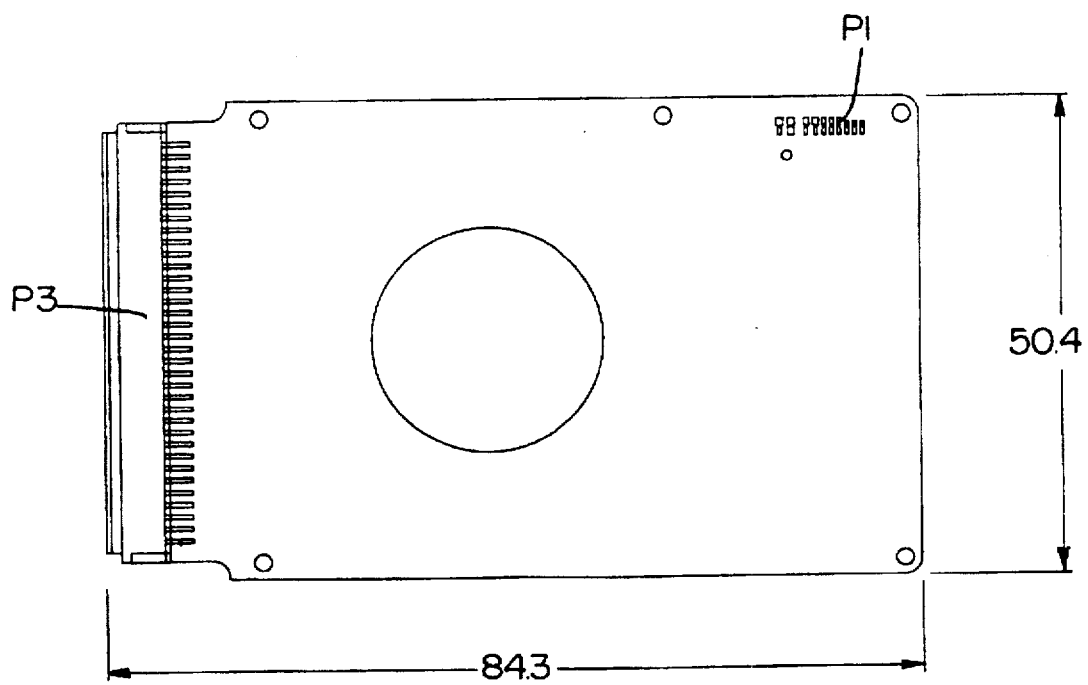

The PCBA (Printed Circuit Board Assembly) 7 as shown in FIG. 1A is populated with integrated circuit components, described more fully in FIGS. 8, 9, and 10. FIG. 1A also shows the fixed drive connector 29 (referred to also as P2). This connector is a standard 50-pin header as required for application of the ATA-IDE standard interface.

FIG. 1C shows the fixed version of the drive in isometric form and defines the overall dimensions of the invention. It should be noted that neither FIG. 1A nor 1B is depicted in true relative scale. FIG. 4A shows in more detail in sectional view the arrangement of the elastomeric connector 32 and how it connects the flexible circuit assembly 16 to the PCBA 7.

FIG. 6A depicts the spindle motor in side view. It comprises a stationary housing 8c which is rigidly fixed into a stepped aperture 1a in the baseplate 1 and a rotatable hub 8b which carries a single disk 9 or two disks 9 separated by spacer 23 and fixed by means of clamp 10. The design of this spindle motor 8 is such that the radial non-repeatable runout of the spindle is less than 0.3 micro-meters whilst the overall height is constrained to approximately 8.2 mm. This latter dimension is critical from the point of view of the overall height of the drive. The stator and rotor of the motor 8 are contained entirely within the housing 8c whose outer diameter is limited to a maximum of 24 millimeters, thus minimising the loss of area on the PCBA on account of the aperture required to accommodate the protruding housing. The torque constant of the spindle motor 8 is approximately 0.0035 Newton meters per Ampere and the normal operating speed is 4800 revolutions per minute. It can accelerate the disk stack up to speed in approximately 1 second and decelerate to rest in around 2 to 3 seconds, thus minimising the time during which the heads are in contact with the disks. The motor is designed to operate from a DC supply voltage in the range of 3 to 5 Volts, supplied via the integral flexible circuit 8a.

FIG. 6B is a corresponding view of an alternative form of motor and mounting. In this case the main part 8d of the motor housing is formed integrally in the die cast baseplate 1 as an annular well 8e. The motor 8 has a rotating shaft 8f rotably mounted inside a bearing housing 8f which is bonded into the central aperture 8g of the annular well 8e.

This form of constuction has the benefit of increasing the stiffness of the base plate 1 which is particularly advantageous in the context of a removable drive as it increases the robustness thereof and improves its resistance to the handling to which a removable drive is likely to be subjected to.

The use of a rotating shaft 8f has the advantage of facilitating use of a single central screw 48 for securing of the clamping plate 10 for clamping of the disk assembly to the motor 8 as shown in the detail view of FIG. 2D of a modified form of the removable drive HDA of FIGS. 2A to 2C (see below). Such an arrangement considerably simplifies assembly by avoiding the need for careful balancing of the tightening of a number of separate spaced apart clamping screws to avoid any possible distortion of the disk assembly.

Figure 7:
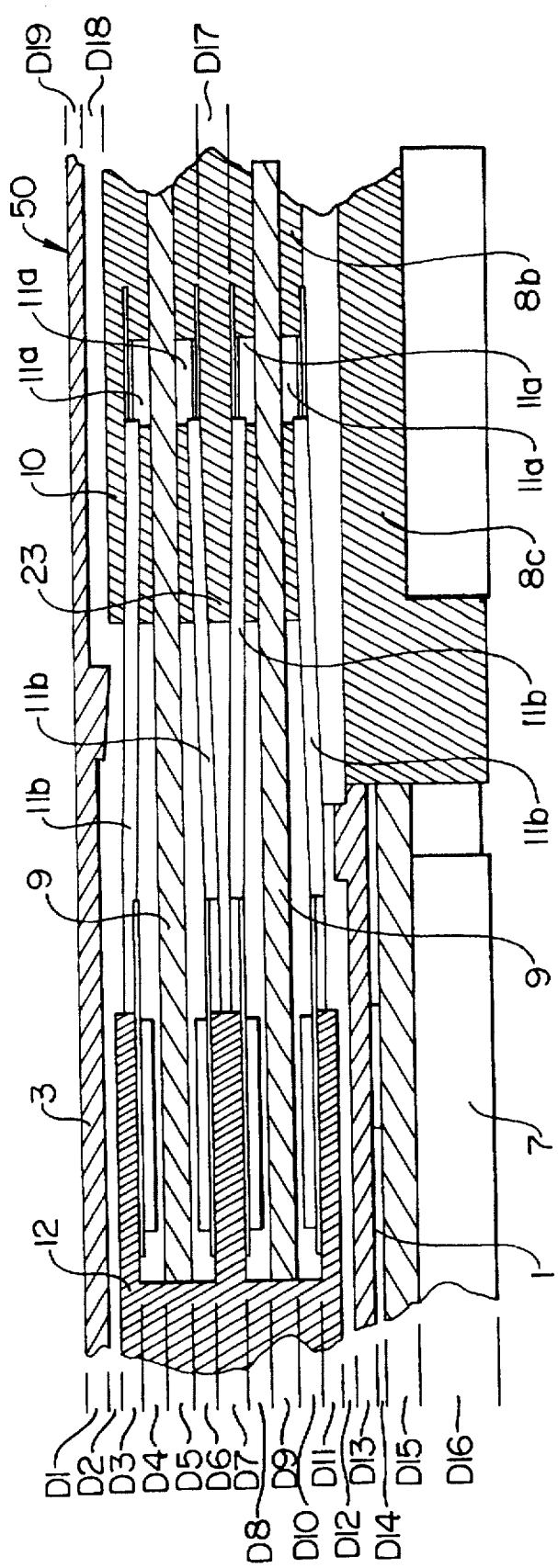
FIG. 7 shows a cross-section through the HDA of the drives of FIGS. 1 and 2.

FIG. 7 is a cross-sectional view of the drive and shows the mechanical construction in clearer detail. The following Table provides details of relevant dimensions and shows how the arrangement results in the achievement of the 10 mm height. Reference numbers apply to FIG. 7 and all dimensions are given in mm.

TABLE

| REF | DIMN | DESCRIPTION | COMMENT |
|---|---|---|---|
| D1 | 0.50 | Cover thickness | Only local to head |
| D2 | 0.345 | Clearance (Cover E-block) | stack working clearance |
| D3 | 0.48 | Top E-block arm thickness | Minimum required for head attachment |
| D4 | 0.58 | Head mounting height ("Z" ht) | Functional position of head |
| D5 | 0.635 | Disk thickness | Typical for aluminium disk |
| D6 | 0.58 | Same as D4 | Same as D4 |
| D7 | 0.76 | Middle E-block arm thickness | Minimum required for back-to-back head attachment |
| D8 | 0.58 | Same as D4 | Same as D4 |
| D9 | 0.635 | Same as D5 | Same as D5 |
| D10 | 0.58 | Same as D4 | Same as D4 |
| D11 | 0.48 | Bottom E-block arm thickness | Same as D3 |
| D12 | 0.345 | Clearance (Base to E-block | Same as D2 |
| D13 | 0.50 | Base thickness | Same as D1 |
| D14 | 0.20 | Clearance (Base to PCBA) | Working clearance |
| D15 | 0.80 | PCB thickness | Minimum for 6 layer PCB |
| D16 | 2.00 | PCBA component height | Maximum permitted |
| D17 | 0.76 | Clearance (head to head) | Head loading clearance |
| D18 | 0.51 | Clearance (Cover to motor) | Working clearance |
| D19 | 0.40 | Cover thickness | Only local to spindle motor |

The critical path through the drive, with respect to height, is from D1 to D16 and shows how the height of 10 mm is attained. Tolerancing of critical component dimensions and fixturing and gauging of assemblies are carefully specified to ensure that adequate operating clearances are maintained.

FIGS. 2A, 2B and 2C show the corresponding arrangement for the removable PCMCIA version of the invention. Components common to both styles are identically numbered. In FIG. 2A, the top magnet plate 21 is also shown and substantially obscures the coil 13, etc. Whereas the HDA cover 3 is common, the actual baseplate 2 differs somewhat from baseplate 1. This is the result of a slightly different PCBA 6 and the fitting of a PCBA cover 4 to provide protection to the PCBA on account of the requirement for removability and handling. The overall connector 30 (P3) conforms to the PCMCIA 68-pin standard and differs from the ATA-IDE connector 29 (P2). FIG. 2C shows the dimensions of the removable drive. It is 0.5 mm thicker at 10.5 mm (meeting the PCMCIA Type III requirement), the extra thickness resulting from the PCBA cover 4. The width is increased from 50.8 mm to 54.0 mm and the length from 78.0 mm to 85.6 mm to meet the PCMCIA standard. In all other mechanical respects the HDAs are essentially identical.

FIG. 5B shows the arrangement of the elastomeric connector for the removable drive. Electrical grounding of the removable drive may be achieved by means of a conductive spring loaded wiper (not shown) within the host system receptacle. This wiper makes contact with the surfaces 49 on the guide rail of the HDA.

The development of the electronic circuit means for the miniature hard disk drive system of the present invention requires the functional elements to be designed in a minimum of physical space. Functionality has been achieved using eight integrated circuits (ICs). One of these ICs is the preamplifier circuit 41 located within the HDA on flexible circuit assembly 16. The other seven ICs are located on the PCBA 7 (or PCBA 6 for the removable version which generally uses an additional IC to handle of the additional requirements of the more complex PCMC1A standard interface).

FIG. 8 shows generally the logical arrangement of electronic functions for the fixed drive and states the purpose and function of each of the eight ICs. The removable version is identical with respect to FIG. 8 except that connector P3 replaces P2. Also shown is 'connector' P1 which consists of the array of gold plated pads mentioned in the description of the elastomeric connector 32.

FIG. 9 shows the physical layout of the ICs on PCBA 7. Also seen is a circular aperture which accommodates the protruding flange 8c of spindle motor 8. PCBA 7 is an assembly of six layers.

As noted above, the PCBA holds the electronics (both hardware and software) which are used to realise the storage capability and performance of the drive. The achievement of 85 MB of capacity is basically dependent on the magnetic characteristics of the heads and disks and on the way that data is formatted on the disk surfaces. The general principles of operation are as follows. The use of thin film heads enables a radial track density of approximately 2500 tracks per inch and a circumferential bit density of 50,000 bits per inch to be achieved. This capability is further enhanced by using 13 data frequencies in separate bands across the disk surface to achieve areal densities that do not vary much from band to band. These data frequencies increase progressively from 11.48 to 19.05 Mbits per second from the inside to the outside radius of the usable part of the disk surface. The resulting optimised areal density of 126 Mbits per square inch (maximum) enables 85.33 MB of formatted storage capacity to be achieved in a two disk configuration. The general principles of operation of the electronics on the PCBA, including those functions which enable this storage capacity to be realised, are as follows.

Read and write data to and from the read/write heads 11 are connected to IC1 41, a 20 pin SOP (small outline package), via flexible circuit assembly 16 on which IC1 is also mounted. IC1 is a front end read/write pre-amplifier which provides a low noise "differential" read-signal voltage amplifier with a gain of approximately 250, write current switching, write current amplitude control and data protection circuitry through reporting of fault conditions. In the WRITE mode, IC1 functions as a differential current switch, with write current being set by selection of an external resistor located on PCBA 7.

During READ mode, the amplified differential read data are fed into IC2 (64 pin SQFP) via connector P1 in FIG. 5. IC2 contains the read channel circuitry consisting of an AGC (automatic gain control) amplifier, programmable low pass filter, pulse detector, servo burst capture, time base generator, data separator and 1,7 RLL (run length limited) ENDEC (encoder/decoder). All these functions are fully programmable via a serial link from IC3 (64 pin SQFP), a custom mixed signal ASIC (application specific integrated circuit), which provides the functions of servo demodulator, interrupt control, switched capacitor filter and serial communications. The decoded read data are fed into IC6 (100 pin SQFP), a data channel/interface controller chip, where they are processed for sending across the interface to the host via connector P2. IC6 provides a programmable disk sequencer, IDE interface, error correction and 4 channel DMA controller. IC7, a 28 pin TSOP (thin small outline package), is a RAM (random access memory) which is used to store information for the sector buffer and microprocessor scratch pad.

"The removable version of the drive has an IC9 (100 pin SQFP) which is located between IC8 and the 68 way interface connector and is also connected to IC4. The circuitry in IC9 provides the main interface connection between the drive and the host system and can be operated in either of two modes. If pin 9 of IC9 is held low when power is applied to the drive then the drive can function on the "68 pin ATA" interface. If pin 9 is not held low then the drive will operate on the PCMCIA "PC CARD ATA" interface. IC9 also contains memory to store the "card information structure", address decoding and other logic which is required for operation of these interfaces."

Figure 11A:
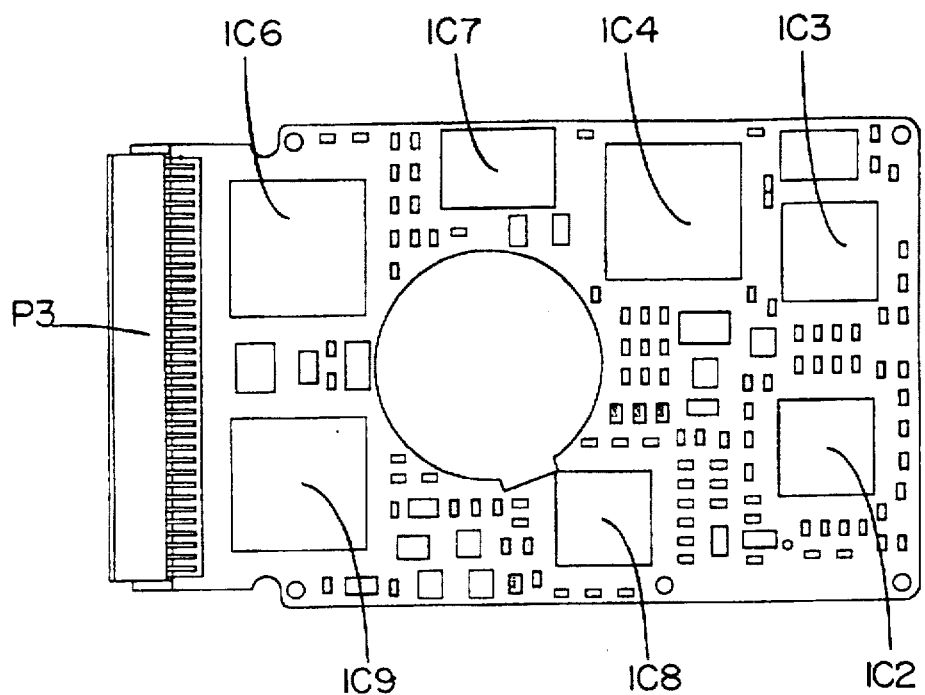
Figure 11B:
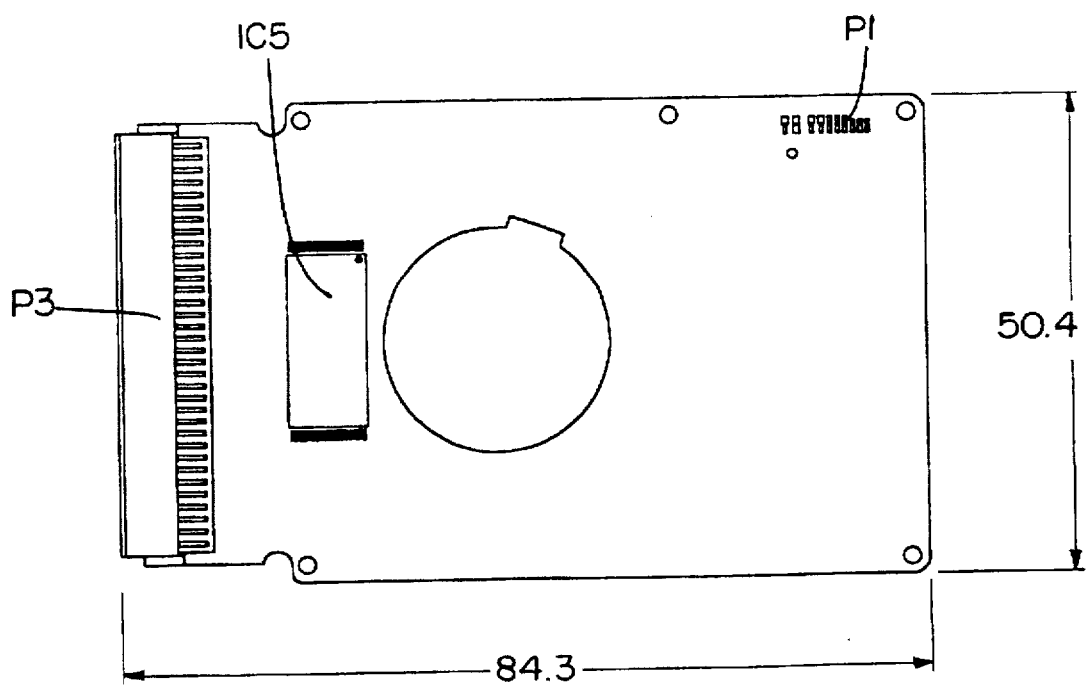

Servo data from the read/write heads 11 are fed through IC1 and are sampled by the peak detectors in IC2 and controlled by timing signals generated by the servo decoder circuitry in IC3. The sampled data are filtered by a switched capacitor filter in IC3 and fed into an ADC (analogue to digital convertor) in IC4 (100 pin SQFP). This IC4 is the micro-processor chip (including firmware) which provides the functions of host interface control, servo control, read/write control, DSP (digital signal processor), self-test control, ADC and DAC (digital to analogue converter). IC4 processes the sampled servo data and controls the head-stack assembly 42 position via the internal DAC driving the voice coil amplifier contained in IC8 (64 pin SQFP). IC8 chip contains the driver/controller circuitry for the spindle motor 8 and voice coil motor 13, 20, 21. Control of the head-stack position is performed by the DSP and micro-controller in IC4 by use of modern control techniques. The software code which is used for the DSP is stored in IC5 (32 pin TSOP) which is a flash EEPROM (electrically erasable programmable memory). In WRITE mode, the data are fed from IC6 to the 1,7RLL ENDEC in IC2 before being sent to the write driver circuitry in IC1. The write data are gated by IC3 to allow head/disk performance to be measured by the drive. The spindle motor 8 is controlled by IC8 which senses back emf voltages from the motor windings to control the commutation and speed. FIG. 10 shows one form of the corresponding PCBA for the PCMCIA version of the drive and FIG. 11 shows another form of the PCBA corrsponding to the schematic block circuit diagram of FIG. 8B wherein the PCMCIA interface is provided separately in IC9.

We claim:

1. A miniature disk drive system comprising:

a substantially sealed enclosure having an external planar side defining an aperture;

first and second contact pad means, said first and second contact pad means being juxtaposed on opposite sides of said aperture;

a printed circuit board mounted outside said substantially sealed enclosure on said planar side of said substantially sealed enclosure and in electrical communication with said first contact pad means, said printed circuit board and said substantially sealed enclosure, together, having a total combined thickness not less than 3.3 mm and not exceeding 10.5 mm;

a head-disk assembly housed within said substantially sealed enclosure, said head-disk assembly comprising a head flexure assembly having at least two read-write heads, said head-disk assembly further comprising an actuator assembly having motor means for pivotally supporting and positioning said head flexure assembly, said read-write heads and said motor means being in electrical communication with said second contact pad means;

a miniature elastomeric connector for establishing pinless electrical communication between corresponding contact pads of the first and second contact pad means disposed at opposite sides of the aperture for making low current capacity electrical connections for data transmission between the read-write heads and the printed circuit board and for making high current capacity electrical connections between the printed circuit board and said motor means of said actuator assembly, wherein said miniature elastomeric connector extends through and at least partially fills said aperture defined by said substantially sealed enclosure.

2. A system according to claim 1 wherein the head disk assembly has two miniature hard disks each having an outer diameter of between 40 and 50 mm.

3. A system according to claim 1 or 2, further comprising a head-disk assembly having a rotary drive motor means in operable connection with the printed circuit board through the elastomeric connector.

4. A system according to claim 1, 2, or 3 wherein the first and second contact pad means are formed and arranged so as to provide substantially all electrical connections between the printed circuit board and the head disk assembly through the elastomeric connector.

5. A system according to claim 1, 2, or 3 wherein the first and second contact pad means comprise a plurality of spaced apart conductors, and wherein the elastomeric connector comprises a plurality of spaced apart conductors having a pitch spacing at least 5 times less than the conductor spacing of the first and second contact pad means.

6. A system according to claim 1, 2, or 3 wherein the first and second contact pad means comprise a plurality of spaced apart contact pads, and wherein the elastomeric connector comprises a plurality of spaced apart conductors having a pitch spacing at least 2 times less than the inter-pad spacing of the first and second contact pad means.

7. A system according to claim 1, 2, or 3 wherein the first and second contact pad means comprise a plurality of contact pads disposed in a two-dimensional array.

8. A system according to claim 1, 2, or 3 wherein said first and second contact pad means comprise a plurality of contact pads, wherein said miniature elastomeric connector extends through said aperture, and wherein the aperture is formed and arranged so as to accommodate lateral expansion of said elastomeric connector due to compression thereof between the first and second contact pad means, the aperture having a plurality of spaced apart inwardly extending locating projections for locating the elastomeric connector within the aperture and having a depth so as to provide substantial lateral support to said elastomeric connector against lateral displacement and/or distortion, thereby facilitating the establishment and maintenance of electrical coupling between respective contact pads of the first and second contact pad means.

9. A system according to claim 1, 2, or 3 wherein said miniature elastomeric connector extends through said aperture, and wherein the aperture is formed and arranged so as to provide a clearance around the elastomeric connector in an uncompressed state for accommodating from 5 to 20% lateral expansion of the elastomeric connector.

10. A system according to claim 1, 2, or 3 wherein said printed circuit board defines a first locating aperture, wherein said head-disk assembly further comprises a flexible circuit defining a second locating aperture, and wherein the system further comprises first and second locating pin means provided on said planar side of said substantially sealed enclosure such that the first and second contact pad means are aligned relative to each other and to the elastomeric connector via engagement of said first and second locating pin means with respective first and second locating apertures provided in the printed circuit board and the flexible circuit.

11. A system according to claim 2, wherein the usable storage capacity per miniature hard disk is not less than 40 megabytes.

12. A system according to claim 1, 2, or 3 wherein said head-disk assembly further comprises at least one disk support means having an axially protecting part, and wherein the printed circuit board defines an aperture therein for receiving therethrough said axially projecting part.

13. A system according to claim 12, wherein said head-disk assembly further comprises a housing for said rotary drive motor means, and wherein a part of the rotary drive motor means housing is formed integrally with said planar side of said substantially sealed enclosure.

14. A system according to claim 13, wherein said rotary drive motor means comprises a drive shaft, and wherein the rotary drive motor means housing comprises an annular well in which said drive shaft is rotatably mounted therein.

15. A miniature disk drive system comprising a substantially sealed enclosure having an external planar side defining an aperture;

first and second contact pad means, wherein said first and second contact pad means are juxtaposed on opposite sides of said aperture, and wherein each contact pad means comprises a plurality of individual contact pads;

a printed circuit board mounted outside said substantially sealed enclosure on said planar side of said substantially sealed enclosure and in electrical communication with said first contact pad means, said printed circuit board and said substantially sealed enclosure, together, having a total combined thickness not less than 3.3 mm and not exceeding 10.5 mm;

a head disk assembly housed within said substantially sealed enclosure and comprising:

two miniature hard disks each having an outer diameter of from 40 to 50 mm;

a support means for rotatably supporting the miniature hard disks within the enclosure;

a rotary drive motor means for rotating the miniature hard disks;

a head flexure assembly having read-write heads for writing digital information on and reading digital information from each surface of the miniature hard disk;

an actuator assembly for pivotally supporting and positioning the head flexure assembly and allowing the read-write heads to write digital information to and read digital information from the disks;

an electronic circuit arranged substantially on the printed circuit board for at least partially controlling the head disk assembly;

flexible circuit means with a first flexible circuit connected to the actuator assembly for electrical connection to the read-write heads and with a second flexible circuit electrically connected with said second contact pad means, said first and second flexible circuits also being electrically connected;

a miniature elastomeric connector, extending through and at least partially filling said aperture, for establishing pinless electrical communication between corresponding pads of the first and second contact pad means disposed at opposite sides of the aperture to thereby establish low current capacity electrical connections for data transmission between the read-write head means and the printed circuit board and to also establish high current capacity electrical connections between the printed circuit board and said rotary drive motor means.

16. A system according to claim 1, 2, or 3, wherein the substantially sealed enclosure and the attached printed circuit board have an overall combined width of approximately 54.0 mm and an overall combined length of approximately 85.6 mm.

* * * * *

UNITED STATES PATENT AND TRADEMARK OFFICE
CERTIFICATE OF CORRECTION

PATENT NO. : 5,757,582  
DATED : May 26, 1998  
INVENTOR(S) : Norman J. White, et al Page 1 of 4

It is certified that error appears in the above-identified patent and that said Letters Patent is hereby corrected as shown below:

Drawings:
Delete Figures 1A and 5B, and substitute therefor the Drawing Sheets, consisting of Figures 1A and 5B, as shown on the attached pages.

UNITED STATES PATENT AND TRADEMARK OFFICE
CERTIFICATE OF CORRECTION

PATENT NO. : 5,757,582
DATED : May 26, 1998
INVENTOR(S) : Norman J. White, et al It is certified that error appears in the above-identified patent and that said Letters Patent is hereby corrected as shown below:

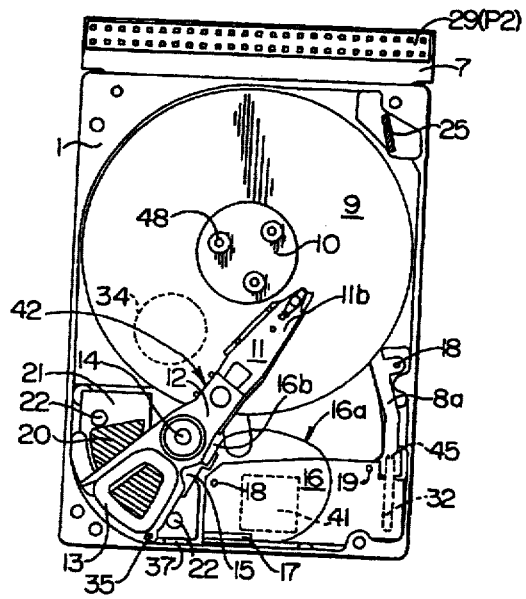

FIG. 1A.

UNITED STATES PATENT AND TRADEMARK OFFICE
CERTIFICATE OF CORRECTION

PATENT NO.    : 5,757,582
DATED         : May 26, 1998
INVENTOR(S)   : Norman J. White, et al It is certified that error appears in the above-identified patent and that said Letters Patent is hereby corrected as shown below:

Delete Figures 1A and 5B, and substitute therefor the Drawing Sheets, consisting of Figure 1A and 5B, as shown on the attached pages.

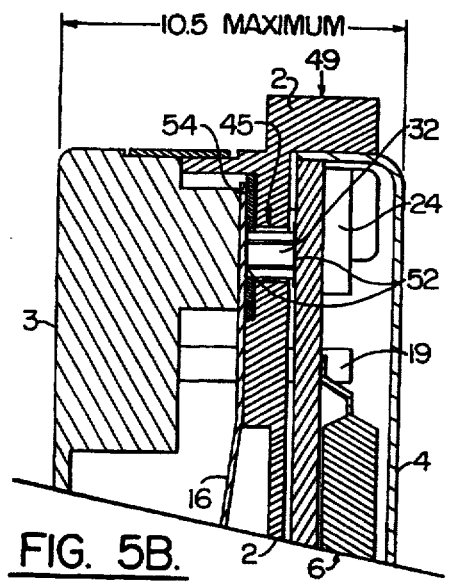

FIG. 5B.

UNITED STATES PATENT AND TRADEMARK OFFICE
CERTIFICATE OF CORRECTION

PATENT NO.  : 5,757,582
DATED       : May 26, 1998
INVENTOR(S) : Norman J. White, et al.

It is certified that error appears in the above-identified patent and that said Letters Patent is hereby corrected as shown below:

Column 18, line 20, please delete "protecting" and insert -- projecting -- therefor.

Column 20, line 5, please delete "1, 2, or 3" and insert -- 1, 2, 3, or 15 -- therefor.

Signed and Sealed this

Twentieth Day of October, 1998

Attest:

BRUCE LEHMAN

Attesting Officer

Commissioner of Patents and Trademarks